United States Patent
Sheng

(10) Patent No.: US 9,769,862 B2
(45) Date of Patent: Sep. 19, 2017

(54) METHOD AND APPARATUS FOR IMPLEMENTING PARTIAL COVERAGE AND OUT-OF-COVERAGE SIDELINK DISCOVERY RESOURCE POOLS FOR WIRELESS COMMUNICATIONS

(71) Applicant: Sharp Laboratories of America, Inc., Camas, WA (US)

(72) Inventor: Jia Sheng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 5 days.

(21) Appl. No.: 15/092,996

(22) Filed: Apr. 7, 2016

(65) Prior Publication Data

US 2016/0302250 A1    Oct. 13, 2016

Related U.S. Application Data

(60) Provisional application No. 62/145,492, filed on Apr. 9, 2015, provisional application No. 62/145,497, filed on Apr. 9, 2015.

(51) Int. Cl.

| | |
|---|---|
| H04B 7/00 | (2006.01) |
| H04W 76/02 | (2009.01) |
| H04W 4/00 | (2009.01) |
| H04W 8/00 | (2009.01) |
| H04W 72/02 | (2009.01) |

(52) U.S. Cl.
CPC ......... *H04W 76/023* (2013.01); *H04W 4/005* (2013.01); *H04W 8/005* (2013.01); *H04W 72/02* (2013.01)

(58) Field of Classification Search
CPC .............................. H04W 76/023; H04W 4/005

USPC ........................................................ 455/41.2
See application file for complete search history.

(56) References Cited

U.S. PATENT DOCUMENTS

| | | | |
|---|---|---|---|
| 9,002,281 B2 | 4/2015 | Fwu | |
| 2006/0036518 A1 | 2/2006 | O'Neill | |
| 2007/0223428 A1* | 9/2007 | Patterson | H04L 12/5895 370/338 |
| 2013/0109301 A1 | 5/2013 | Hakola et al. | |
| 2013/0128823 A1 | 5/2013 | Turtinen et al. | |
| 2013/0273923 A1 | 10/2013 | Li et al. | |
| 2013/0288608 A1 | 10/2013 | Fwu | |
| 2014/0126509 A1* | 5/2014 | You | H04B 7/04 370/329 |
| 2014/0328329 A1* | 11/2014 | Novlan | H04W 72/042 370/336 |
| 2015/0016355 A1 | 1/2015 | Yie et al. | |
| 2015/0043448 A1 | 2/2015 | Chatterjee | |

(Continued)

FOREIGN PATENT DOCUMENTS

| | | |
|---|---|---|
| WO | 2013/177449 A1 | 11/2013 |
| WO | 2014/182342 A1 | 11/2014 |
| WO | 2015/003365 A1 | 1/2015 |

OTHER PUBLICATIONS

International Search Report and Written Opinion mailed Jul. 7, 2016 in PCT Application No. PCT/US2016/026320.

(Continued)

*Primary Examiner* — April G Gonzales
(74) *Attorney, Agent, or Firm* — Nixon & Vanderhye P.C.

(57) ABSTRACT

Methods and apparatus are provided for enabling a wireless terminal to operate in a partial coverage scenario and an out-of-coverage scenario.

14 Claims, 15 Drawing Sheets

(56) References Cited

U.S. PATENT DOCUMENTS

| | | |
|---|---|---|
| 2015/0215903 A1 | 7/2015 | Zhao |
| 2015/0271720 A1 | 9/2015 | Yamada |
| 2015/0271841 A1 | 9/2015 | Yamada |
| 2015/0271846 A1 | 9/2015 | Kowalski |
| 2015/0319797 A1 | 11/2015 | Yamada |
| 2015/0327240 A1 | 11/2015 | Yamada |
| 2015/0339718 A1* | 11/2015 | Walton ............... G06Q 30/0261 705/14.16 |
| 2015/0341794 A1* | 11/2015 | Vanderveen ....... G06Q 30/0261 705/14.58 |
| 2015/0382324 A1 | 12/2015 | Sheng et al. |
| 2016/0095092 A1 | 3/2016 | Khoryaev |
| 2016/0095112 A1 | 3/2016 | Panteleev |
| 2016/0135200 A1 | 5/2016 | Brahmi |
| 2016/0234718 A1 | 8/2016 | Thangarasa |
| 2016/0249198 A1 | 8/2016 | Kim |
| 2016/0255615 A1 | 9/2016 | Chatterjee |

OTHER PUBLICATIONS

3GPP TS 36.213 V12.4.0; Technical Specification; 3$^{rd}$ Generation Partnership Project; Technical Specification Group Radio Access Network; Evolved Universal Terrestrial Radio Access (E-UTRA); Physical Layer Procedures (Release 12) (Dec. 2012).
R2-150734, 3GPP TSG-RAN2 #89 meeting; Samsung, "Introduction of ProSe", Athens, Greece, Feb. 9-13, 2015.
R2-150645, 3GPP TSG-RAN WG2 Meeting #89; Intel Corporation, Fujitsu, InterDigital, Huawei, HiSilicon, ZTE, "Corrections to Stage 2 Description of ProSe"; Athens, Greece, Feb. 9-13, 2015.
3GPP TS 23.303 V12.3.0; Technical Specification; 3$^{rd}$ Generation Partnership Project; Technical Specification Group Services and System Aspects; Proximity-based Services (ProSe); Stage 2 (Release 12) (Dec. 2014).
3GPP TS 36.843 V12.0.1; Technical Report; 3$^{rd}$ Generation Partnership Project; Technical Specification Group Radio Access Network; Study on LTE Device to Device Proximity Services; Radio Aspects (Release 12) (Mar. 2014).
Office Action mailed Sep. 8, 2016 in U.S. Appl. No. 15/092,788.
International Search Report and Written Opinion mailed Jul. 12, 2016 in PCT Application No. PCT/US2016/026439.
International Search Report and Written Opinion mailed Nov. 19, 2015 in PCT Application No. PCT/US15/37650.
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
R1-141859, 3GPP TSG RAN WG1 Meeting #76bis, "Way Forward on Discovery Signal Design and Network Assistance", NTT Docomo, Huawei, HiSilicon, Samsung, Sony, Sharp, ZTE, LG Electronics, Hitachi, ETRI, Media Tek, Shenzhen, China, Mar. 31-Apr. 4, 2014.
3GPP TS 23.303 V12.0.0 Technical Specification, 3$^{rd}$ Generation Partnership Project; Technical Specification Group Services and Systems Aspects; Proximity-based Services (ProSe); Stage 2 (Release 12) (Feb. 2014).
R2-14XXX, 3GPP TSG RAN WG1 Meeting #87, Introduction of ProSe, Samsun, Dresden, German, Aug. 18-22, 2014.
U.S. Appl. No. 14/660,622, filed Mar. 17, 2015, entitled "Device-to-Device Communications Apparatus and Methods".
3GPP TS 36.331 V12.1.0 Technical Specification, 3$^{rd}$ Generation Partnership Project; Technical Specification Group Radio Access Network; Evolved Universal Terrestrial Radio Access (E-UTRA); Radio Resource Control (RRC) Protocol Specification (Release 12) (Mar. 2014).
U.S. Appl. No. 15/092,988, filed Apr. 7, 2016, entitled Method and Apparatus for Sidelink Direct Discovery Resource Pool Allocation for Out-of-Coverage Wireless Terminal.
R1-141969 3GPP TSG-RAN WG1 #77, Qualcomm Incorporated, "Resource Allocation for Mod 2 D2D Broadcast Communication", Seoul, Korea, May 19-23, 2014.
R1-150962 3GPP TSG-RAN WG1 Meeting #80, Change Request, Athens, Greece, Feb. 9-13, 2015.
Office Action mailed Oct. 7, 2016 in U.S. Appl. No. 14/749,898.

* cited by examiner

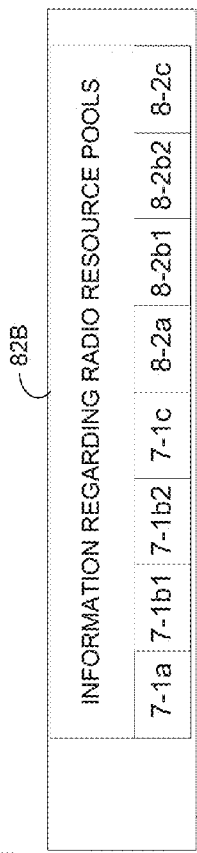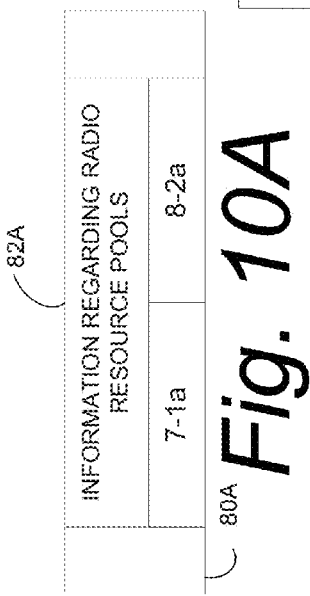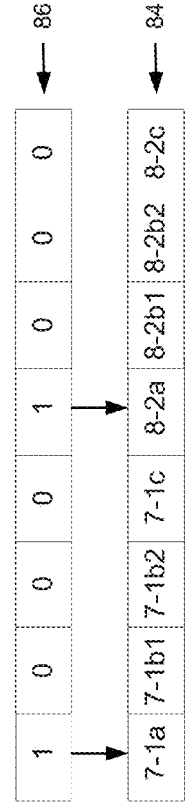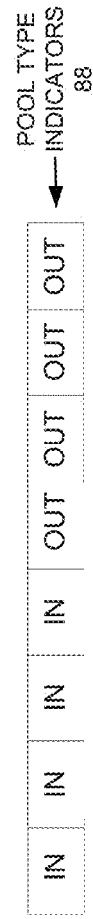

METHOD AND APPARATUS FOR IMPLEMENTING PARTIAL COVERAGE AND OUT-OF-COVERAGE SIDELINK DISCOVERY RESOURCE POOLS FOR WIRELESS COMMUNICATIONS

This application claims the priority and benefit of the following United States Provisional applications, both of which are incorporated herein by reference in their entirety: (1) U.S. Provisional application 62/145,492 filed Apr. 9, 2015 and entitled "METHOD AND APPARATUS FOR SIDELINK DIRECT DISCOVERY RESOURCE POOL ALLOCATION FOR OUT-OF-COVERAGE WIRELESS TERMINAL"; and (2) U.S. Provisional application 62/145,497 filed on Apr. 9, 2015 and entitled "METHOD AND APPARATUS FOR IMPLEMENTING PARTIAL COVERAGE AND OUT-OF-COVERAGE SIDELINK DISCOVERY RESOURCE POOLS FOR WIRELESS COMMUNICATIONS".

TECHNICAL FIELD

The technology relates to wireless communications, and particularly to allocating or granting radio resources for wireless device-to-device (D2D) or sidelink communications, and more particularly to providing resources for sidelink direct discovery.

BACKGROUND

When two wireless terminals (e.g., UEs or mobile communication devices) of a cellular network or other telecommunication system communicate with each other, their data path has historically gone through the operator network. The data path through the network may include base stations and/or gateways. If the wireless terminals are in close proximity with each other, their data path may be routed locally through a local base station. In general, communications between a network node such as a base station and a wireless terminal is known as "WAN" or "Cellular communication".

It is also possible for two wireless terminals in close proximity to each other to establish a link with one another without the need to go through a base station. Telecommunications systems may use or enable such device-to-device ("D2D") communication, in which two or more user equipment terminals communicate with one another. In D2D communication, voice and data traffic (referred to herein as "communication signals") from one user equipment terminal may be transmitted to one or more other user equipment terminals may without the communication signals passing through a base station or other network control device of a telecommunication system. As such, device-to-device (D2D) communications differ from "WAN" or "Cellular communication". Device-to-device (D2D) communication has more recently also become known as "sidelink direct communication".

Sidelink direct communication may be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

A non-exhaustive list of 3GPP documents which describe, at least in part, device-to-device (D2D) communication (e.g., "sidelink direct communication"), and which may be pertinent to the technology disclosed herein, include the following (all of which are incorporated herein by reference in their entireties):

R2-150645, 3GPP TSG-RAN WG2 Meeting #89, Athens, Greece, Feb. 9-13, 2015, Corrections to Stage 2 Description of ProSe ("R2-150645").

R1-150962, Introduction of D2D (ProSe) feature into 3GPP TS 36.213 V12.4.0 (2014-December), ("R1-150962").

R2-150734, 3GPP TSG-RAN2#89 meeting Athens, Greece, 9-13 Feb. 2015, change request to 36.331 V. 14.4.1 ("R2-150734").

3GPP TS 23.303 V12.4.0 (2015-March), 3rd Generation Partnership Project; Technical Specification Group Radio Access Network; Evolved Universal Terrestrial Radio Access (E-UTRA); Physical layer procedures; (Release 12).

3GPP TS 36.843 V12.0.1 (2014-March), 3rd Generation Partnership Project; Technical Specification Group Radio Access Network; Study on LTE Device to Device Proximity Services; Radio Aspects.

R2-150645 §23.10.3 describes, e.g., radio resource allocation for Proximity Service, and in particular two modes of resource allocation known as the scheduled resource allocation mode and the autonomous resource selection mode. As described in §23.10.3, scheduled resource allocation is characterized by the wireless terminal (UE) being RRC_CONNECTED mode in order to transmit data, and the wireless terminal (UE) requesting transmission resources from the eNodeB (after which the eNB schedules transmission resources for transmission of Sidelink Control and data). On the other hand, UE autonomous resource selection is characterized by a UE on its own selecting resources from resource pools and performing transport format selection to transmit Sidelink Control and data.

R2-150645 §23.10.3 further describes, e.g., that a UE is considered in-coverage for ProSe Direct Communication whenever it detects a cell on a Public Safety ProSe Carrier in accordance with specified criteria. R2-150645 §23.10.3 also discusses resource selection/allocation rules; what happens when a UE that is camped or connected to one carrier frequency but interested in ProSe Direct Communication in another carrier frequency; and certain selection options for a cell on the Public Safety ProSe carrier.

R2-150645 §23.10.3.1 describes, e.g., resource pools for sidelink control, both for when a wireless terminal is out-of-coverage and within coverage. For an out-of-coverage UE, the resources pools used for reception and transmission are pre-configured. For an in coverage UE, the reception resource pool and the transmission resource pool are configured by the eNodeB. R2-150645 §23.10.3.2 describes, e.g., resource pools for sidelink data.

R2-150645 §23.10.3.1 describes, e.g., support for ProSe Direct Discovery. ProSe Direct Discovery is a procedure used by the UE to discover other wireless terminals (e.g., UEs) in its proximity, using E-UTRA direct radio signals via the PC5 interface. ProSe Direct Discovery is only supported when the UE is served by E-UTRAN. R2-150645 §23.10.3.1 explains, e.g., that an upper layer (e.g., ProSe Protocol) handles authorization for announcement and monitoring of discovery messages. The ProSe Protocol layer is above the medium access control (MAC) layer, which in turn is above the physical layer. Such is also described in R2-150645 §23.11.2, which pertains to radio protocol architecture.

R2-150645 §23.11.3 describes, e.g., two types of resource allocation for a discovery message announcement (UE autonomous resource selection and scheduled resource allocation) and characteristics of both types of resource allocation.

R2-150645 §23.11.3 also states that, for UEs in RRC_IDLE, the eNodeB may selection one of two options. The first option is that the eNB may provide a resource pool for UE autonomous resource selection based discovery message announcement in system information block (SIB 19), and UEs that are authorized for Prose Direct Discovery use these resources for announcing discovery message in RRC_IDLE. The second option is that the eNB may indicate in SIB 19 that it supports ProSe Direct Discovery but does not provide resources for discovery message announcement, in which case the UEs need to enter RRC_CONNECTED in order to request resources for discovery message announcement.

R2-150645 §23.11.3 also states, e.g., that for UEs in RRC_CONNECTED, the eNB may configure the UE with a resource pool for UE autonomous resource selection for discovery message announcement via dedicated signaling. The resources allocated by the eNB via dedicated signalling are valid until the eNB re-configures the resource(s) by RRC signalling or the UE enters RRC_IDLE. Authorized receiving UEs in RRC_IDLE and RRC_CONNECTED may monitor resource pools used for UE autonomous resource selection and resource pools for scheduled resource allocation. The eNB provides the resource pool configuration used for discovery message monitoring in SIB 19. The SIB 19 may contain detailed ProSe Direct Discovery configuration used for announcing in neighbour cells of intra-frequency as well.

R2-150645 §23.11.3 further states, e.g., that a UE if authorized by the network (NW) can announce discovery message only on a serving cell. The UE can monitor discovery resources in the same as well as other frequencies than the serving cell, in same or different PLMNs. The serving cell may provide in SIB 19 a list of frequencies along with PLMN ID on which the UE may aim to monitor discovery message. An RRC_CONNECTED UE sends a ProSe UE Information indication to the serving cell if it is interested or no longer interested in intra-frequency, inter-frequency or inter-PLMN discovery message monitoring.

R1-150962 describes, e.g., physical sidelink discovery channel procedures. Among the procedures described are a UE procedure for transmitting the PSDCH (§14.3.1); a UE procedure for receiving the PSDCH (§14.3.2); and a UE procedure for determining resource block pool and subframe pool for sidelink discovery (§14.3.3).

R2-150734 describes, e.g., certain ProSe discovery related information, such as actions upon reception of SystemInformationBlockType19 (§5.2.2.x2); conditions for establishing RRC connection for sidelink direct communication/discovery (§5.3.3.1a), and sidelink dedicated configuration (§5.3.10x). In addition, R2-150734 provides, e.g., an introduction to sidelink (§5.x et seq), including conditions for sidelink operation and sidelink UE information (initiation, actions related to transmission of SidelinkUEInformation message, direct discovery monitoring, and direct discovery announcement), as well as sidelink pre-configured parameters (§9.x).

3GPP TS 23.303 V12.4.0 (2015-March) provides an overview of ProSe Direct Discovery (§5.3.1.1), including ProSe Direct Discovery Models A and B.

Generally, there are three scenarios which may occur in sidelink discovery. Those three sidelink direct discovery scenarios are illustrated in FIG. 1. A first of the sidelink discovery scenario is an "in coverage" discovery scenario, illustrated as SL discovery between UE1 and UE2 of FIG. 1, in which both UE1 and UE2 are within coverage of the radio access network. A second sidelink discovery scenario is a "partial coverage" discovery scenario, illustrated as SL discovery between UE2 and UE3 of FIG. 1. In the "partial coverage" sidelink discovery scenario the wireless terminal UE2 is within coverage of the radio access network, but the wireless terminal UE3 is out-of-coverage of the radio access network. A third sidelink discovery scenario is an "out-of-coverage" discovery scenario, illustrated as SL discovery between wireless terminal UE3 and wireless terminal UE4 of FIG. 1. In the out-of-coverage sidelink discovery scenario both the wireless terminal UE3 and the wireless terminal UE4 are out-of-coverage of the radio access network.

The three sidelink discovery scenarios are described with reference to whether or not a participating wireless terminals (e.g., UEs) are "in coverage" or "out-of-coverage" of one or more radio access networks (which may collectively be referred to as a "radio access network"). For sake of simplicity FIG. 1 depicts "coverage" as being with respect to an access node such as eNodeB which comprises a radio access network. It should be understood, however, that a wireless terminal may also be in coverage of the radio access network when served by any cell of the radio access network(s). For example, If wireless terminal UE1 and wireless terminal UE2 were served by different cells, when participating in sidelink direct discovery the wireless terminal UE1 and wireless terminal UE2 would still be in an in coverage sidelink discovery scenario.

In 3GPP Release 12 proximity service (ProSe) specifications, two types of sidelink (SL) services were defined: SL communications and SL direct discovery. Sidelink communications cover in coverage (IC) and out of coverage (OOC) scenarios with corresponding resource pool allocation methods. However, SL direct discovery has been defined in 3GPP Release 12 only for the in coverage discovery scenario.

What is needed, therefore, and an example object of the technology disclosed herein, are methods, apparatus, and techniques for performing sidelink direct discovery in the partial coverage discovery scenario and the out-of-coverage discovery scenario.

SUMMARY

In one of its aspects the technology disclosed herein concerns a radio access node of a radio access network. The access node comprises a processor and a transmitter. The processor is configured and arranged to configure, for a wireless terminal that is served by the node, a radio resource pool including an out-of-coverage radio resource for the wireless terminal to use for sidelink direct discovery when the wireless terminal is either in a partial coverage discovery scenario or an out-of-coverage discovery scenario. The transmitter is configured to transmit information regarding the pool over a radio interface to the wireless terminal when the wireless terminal is in coverage of the radio access network.

In an example embodiment and mode the transmitter is configured to transmit the information regarding the pool in Radio Resource Control (RRC) signaling.

In an example embodiment and mode transmitter is configured to transmit the information regarding the pool in broadcast or dedicated signaling when wireless terminal autonomous resource selection is implemented.

In an example embodiment and mode the transmitter is configured to transmit the information regarding the pool in dedicated signaling when wireless terminal scheduled resource allocation is implemented.

In an example embodiment and mode the processor is further configured to configure the pool to include an in-coverage radio resource pool allocated for the wireless terminal to use when the wireless terminal is in coverage of the radio access network In another of its aspects the technology disclosed herein concerns a method of operating a node in a radio access network (RAN). In a basic embodiment and mode the method comprises configuring, for a wireless terminal, a radio resource pool including an out-of-coverage radio resource for use in sidelink direct discovery when the wireless terminal is either in a partial coverage discovery scenario or an out-of-coverage discovery scenario; and transmitting information regarding the pool over a radio interface to the wireless terminals when the wireless terminal is in coverage of the radio access network.

In another of its aspects the technology disclosed herein concerns method in a wireless terminal. In a basic embodiment and mode the method comprises: receiving over a radio interface information regarding a radio resource pool allocated to the wireless terminal for sidelink direct discovery when the wireless terminal is either in partial coverage discovery scenario or out-of-coverage discovery scenario; and the wireless terminal when either in partial coverage of the radio access network or out-of-coverage of the radio access network using a resource of the pool for sidelink direct discovery.

In another of its aspects the technology disclosed herein concerns a wireless terminal comprising a receiver and a processor. The receiver is configured to receive over a radio interface information regarding a radio resource pool allocated to the wireless terminal for sidelink direct discovery when the wireless terminal is either in partial coverage discovery scenario or out-of-coverage discovery scenario. The processor is configured to use a resource of the pool for sidelink direct discovery when the wireless terminal is either in partial coverage of the radio access network or out-of-coverage of the radio access network.

In an example embodiment and mode the processor is configured to use the resource of the pool for sending a sidelink direct discovery announcement.

In an example embodiment and mode the processor is configured to use the resource of the pool for monitoring a sidelink direct discovery announcement of another wireless terminal.

In an example embodiment and mode the receiver is configured to receive the information regarding the pool in Radio Resource Control (RRC) signaling.

In an example embodiment and mode the receiver is configured to receive the information regarding the pool in broadcast or dedicated signaling when wireless terminal autonomous resource selection is implemented.

In an example embodiment and mode the receiver is configured to receive the information regarding the pool in dedicated signaling when wireless terminal scheduled resource allocation is implemented.

In an example embodiment and mode the pool includes an in-coverage radio resource pool allocated for sidelink direct discovery, and wherein the processor is further configured to use the in-coverage radio resource pool use when the wireless terminal is in coverage of the radio network.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 10A and FIG. 10B are diagrammatic views of example signals which may comprise information regarding a pool for sidelink direct discovery use.

FIG. 11 is a diagrammatic view of example selection signal or selection indication that specifies which of plural radio resource pools are eligible for use as a selected radio resource pool for sidelink direct discovery.

FIG. 12 is a diagrammatic view showing that one or more radio resource pools may have associated therewith a pool type indicator.

DETAILED DESCRIPTION

Figure 1:
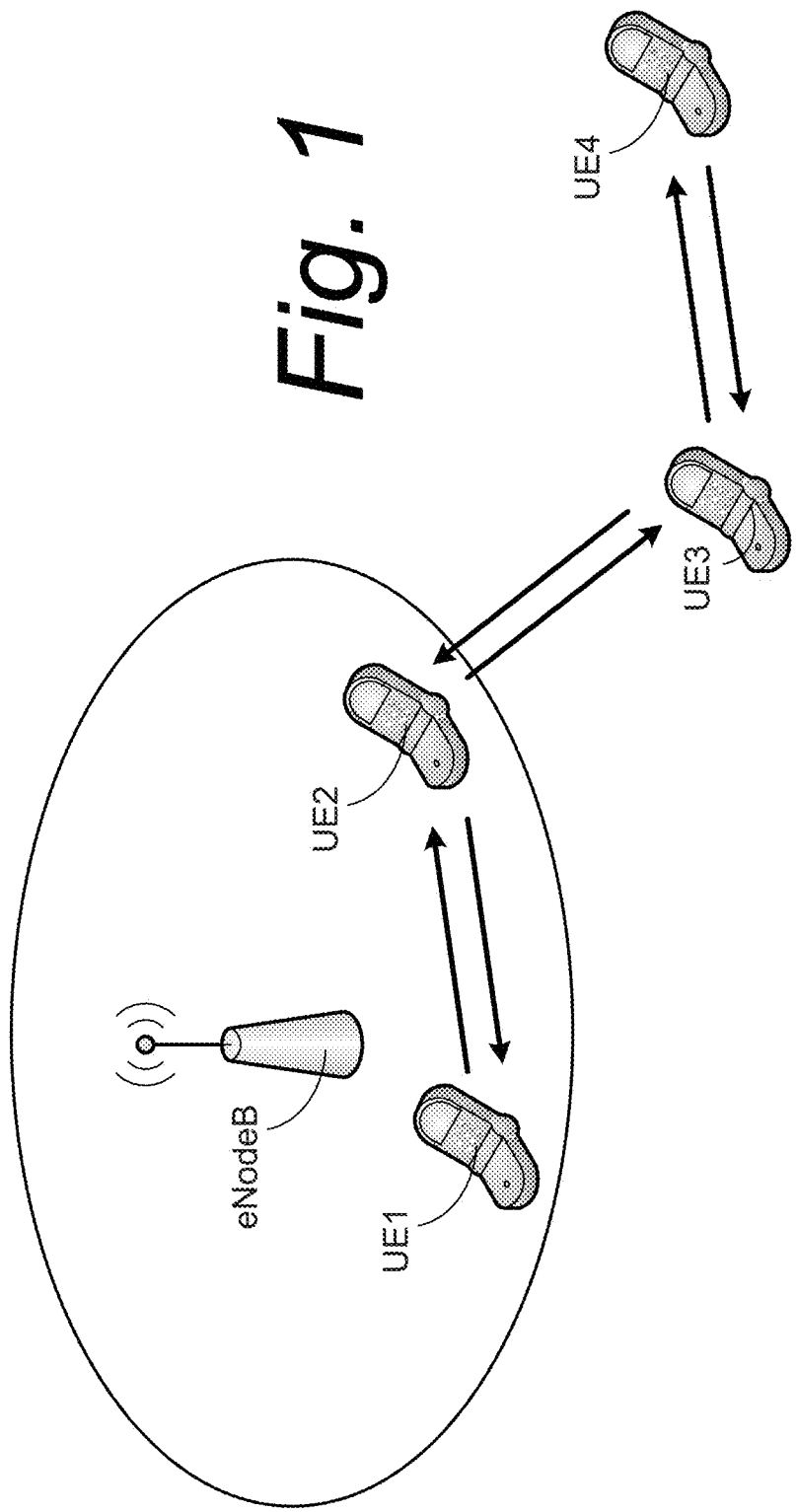
FIG. 1 is a diagrammatic view showing generally three scenarios which may occur in sidelink direct discovery, i.e., an in coverage sidelink direct discovery scenario; a partial coverage sidelink direct discovery scenario; and an out-of-coverage sidelink direct discovery scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Thus, as mentioned above, device-to-device (D2D) communications differs from "WAN" or "Cellular communication" which is or involves communication between the base station and the wireless terminal. Communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, a "D2D signal" or "D2D signals" includes channels, reference signals, and synchronization signals for D2D communication and/or discovery.

The sidelink direct discovery for the in coverage discovery scenario may follow the following procedure:

The UE supporting ProSe Direct Communication can operate in two modes for resource allocation:
  Scheduled resource allocation is characterized by:
    The UE needs to be RRC_CONNECTED in order to transmit data;
    The UE requests transmission resources from the eNB.
    The eNB schedules transmission resources for transmission of Sidelink Control and data;
    The UE sends a scheduling request (D-SR or Random Access) to the eNB followed by a ProSe BSR. Based on the ProSe BSR the eNB can determine that the UE has data for a ProSe Direct Communication transmission and estimate the resources needed for transmission. eNB can schedule transmission resources for ProSe Direct Communication using configured SL-RNTI.
  UE autonomous resource selection is characterized by:
    A UE on its own selects resources from resource pools and performs transport format selection to transmit Sidelink Control and data.
A UE in RRC_CONNECTED may send a ProSe UE Information indication to eNB when UE becomes interested in ProSe Direct Communication. In response eNB may configure the UE with a SL-RNTI.
A UE is considered in-coverage for ProSe Direct Communication whenever it detects a cell on a Public Safety ProSe Carrier as per criteria specified in [16]. The following rules apply for the UE:
  If the UE is out of coverage for ProSe Direct Communication it can only use UE autonomous resource selection;
  If the UE is in coverage for ProSe Direct Communication it may use scheduled resource allocation or UE autonomous resource selection as per eNB configuration;
  If the UE is in coverage for ProSe Direct Communication it may use only the resource allocation mode indicated by eNB configuration unless one of the exceptional cases as specified in [16] occurs;
    When an exceptional case occurs the UE is allowed to use UE autonomous resource selection temporarily even though it was configured to use scheduled resource allocation. Resource pool to be used during exceptional case may be provided by eNB.
A UE that is camped or connected on one carrier frequency but interested in ProSe Direct Communication operation on another carrier frequency (i.e. Public Safety ProSe Carrier) may attempt to find cells on the Public Safety ProSe Carrier.
  An RRC_IDLE UE camped on a cell in another carrier frequency, but in the coverage area of an E-UTRA cell on Public Safety ProSe Carrier may consider the Public Safety ProSe carrier to be the highest priority; and reselects to the cell on the Public Safety ProSe Carrier. UE may consider a frequency (non-Public Safety ProSe carrier) to be the highest priority if it can perform ProSe Direct Communication only while camping on the frequency;
  An RRC_CONNECTED UE served by a cell in another carrier frequency may send a ProSe UE Information indication to its serving cell when it wants to perform ProSe Direct Communication. The indication contains the intended Public Safety ProSe Carrier;
    The serving cell indicates with the presence of SIB 18 whether the UE is allowed to send a ProSe UE Information indication;
    The serving cell may configure an inter-frequency RRM measurement on the Public Safety ProSe Carrier;
    Once the UE enters coverage of a cell on the Public Safety ProSe Carrier, based on measurement report the eNB performs inter-frequency mobility to the Public Safety ProSe Carrier;
    If inter-frequency mobility is not performed by the serving cell, or if it fails, the UE may still perform ProSe Direct Communication using UE autonomous resource selection from the resource pools, if any, broadcasted by the detected E-UTRA cell on the Public Safety ProSe Carrier.
  If the UE does not detect an E-UTRA cell on the Public Safety ProSe Carrier, the UE can use Public Safety ProSe Carrier resources preconfigured in the UICC or ME for out of coverage ProSe Direct Communication;
  If the UE detects an E-UTRA cell on the Public Safety ProSe Carrier, the UE stops using resources preconfigured in the UICC or ME. UE may use UE autonomous resource selection from the resource pools, if any, broadcasted by the detected E-UTRA cell on the Public Safety ProSe Carrier.
  NOTE: For Rel-12 all ProSe communication (for a UE) is performed on a single preconfigured Public Safety ProSe Carrier, which is valid in the operating region. Higher layers check validity of the Public Safety ProSe Carrier in the operating region.
The cell on the Public Safety ProSe Carrier may select one of the following options:
  The cell on the Public Safety ProSe Carrier may provide a transmission resource pool for UE autonomous resource selection in SIB 18;

UEs that are authorized for ProSe Direct Communication may use these resources for ProSe Direct Communication in RRC_IDLE in the cell on the same carrier (i.e. Public Safety ProSe Carrier).

UEs that are authorized for ProSe Direct Communication may use these resources for ProSe Direct Communication in RRC_IDLE or RRC_CONNECTED in a cell on another carrier.

The cell on the Public Safety ProSe Carrier may indicate in SIB 18 that it supports ProSe Direct Communication but does not provide transmission resources. UEs need to enter RRC_CONNECTED to perform ProSe Direct Communication transmission. In this case the cell on the Public Safety ProSe Carrier may provide in broadcast signalling an exceptional transmission resource pool for UE autonomous resource selection, to be used by the UE in exceptional cases, as specified in [16].

A UE in RRC_CONNECTED that is authorized to perform ProSe Direct Communication transmission indicates to the serving eNB that it wants to perform ProSe Direct Communication transmissions;

The eNB validates whether the UE is authorized for ProSe Direct Communication transmission using the UE context received from MME;

The eNB may configure a UE by dedicated signalling with a transmission resource pool for UE autonomous resource selection; that may be used without constraints while the UE is in RRC_CONNECTED. Alternatively, the eNB may configure a UE to use the exceptional transmission resource pool for UE autonomous resource selection which the UE is allowed to use only in exceptional cases, as specified in [16], and rely on scheduled resource allocation otherwise.

23.10.3.1 Resource Pool for Sidelink Control

The resource pools for Sidelink Control when the UE is out of coverage for ProSe Direct Communication are configured as below:

The resource pool used for reception is pre-configured;
The resource pool used for transmission is pre-configured.

The resource pools for Sidelink Control when the UE is in coverage for ProSe Direct Communication are configured as below:

The resource pool used for reception is configured by the eNB via RRC, in broadcast signalling;

The resource pool used for transmission is configured by the eNB via RRC, in dedicated or broadcast signalling, if UE autonomous resource selection is used;

The resource pool used for transmission is configured by the eNB via RRC, in dedicated signalling if scheduled resource allocation is used;

The eNB schedules the specific resource(s) for Sidelink Control transmission within the configured reception pool.

NOTE: In order to perform communication even when some UEs are in-coverage and some UEs are out of coverage, all UEs (i.e. both in and out of coverage) may be configured with reception resource pools for Sidelink Control which are the union of the resource pools used for transmission of Sidelink Control in the serving cell and neighbour cells and transmission of Sidelink Control for out of coverage.

23.10.3.2 Resource Pool for Data

The resource pools for data when the UE is out of coverage for ProSe Direct Communication are configured as below:

The resource pool used for reception is pre-configured;
The resource pool used for transmission is pre-configured.

The resource pools for data when the UE is in coverage for ProSe Direct Communication are configured as below:

The resource pools used for transmission and reception are configured by the eNB via RRC, in dedicated or broadcast signalling, if UE autonomous resource selection is used;

There is no resource pool for transmission if scheduled resource allocation is used.

23.11 Support for ProSe Direct Discovery 23.11.1 General

ProSe Direct Discovery is defined as the procedure used by the UE supporting ProSe Direct Discovery to discover other UE(s) in its proximity, using E-UTRA direct radio signals via PC5. ProSe Direct Discovery is supported only when the UE is served by E-UTRAN.

Upper layer handles authorization for announcement and monitoring of discovery message.

Content of discovery message is transparent to Access Stratum (AS) and no distinction in AS is made for ProSe Direct Discovery models and types of ProSe Direct Discovery [62].

NOTE: The ProSe Protocol ensures that only valid discovery messages are delivered to AS for announcement.

The UE can participate in announcing and monitoring of discovery message in both RRC_IDLE and RRC_CONNECTED states as per eNB configuration. The UE announces and monitors its discovery message subject to the half-duplex constraint. The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

NOTE: UE may obtain UTC time from the RAN via SIB 16 or from other sources such as NITZ, NTP, and GNSS depending on their availability.

In order to perform synchronisation UE(s) participating in announcing of discovery messages may act as a synchronisation source by transmitting a synchronisation signal based on the resource information for synchronisation signals provided in SIB 19. There are three range classes. Upper layer authorisation provides applicable range class of the UE. Maximum allowed transmission power for each range class is signalled in SIB 19. UE uses the applicable maximum allowed transmission power corresponding to its authorised range class. This puts an upper limit on the determined transmit power based on open loop power control parameters.

23.11.2 Radio Protocol Architecture

The Access Stratum protocol stack for ProSe Direct Discovery consists of only MAC and PHY.

The AS layer performs the following functions:

Interfaces with upper layer (ProSe Protocol): The MAC layer receives the discovery message from the upper layer (ProSe Protocol). The IP layer is not used for transmitting the discovery message;

Scheduling: The MAC layer determines the radio resource to be used for announcing the discovery message received from upper layer;

Discovery PDU generation: The MAC layer builds the MAC PDU carrying the discovery message and sends the MAC PDU to the physical layer for transmission in the determined radio resource. No MAC header is added.

23.11.3 Radio Resource Allocation

There are two types of resource allocation for discovery message announcement.

UE autonomous resource selection: A resource allocation procedure where resources for announcing of discovery message are allocated on a non UE specific basis, further characterized by:
  The eNB provides the UE(s) with the resource pool configuration used for announcing of discovery message. The configuration may be signalled in broadcast or dedicated signalling;
  The UE autonomously selects radio resource(s) from the indicated resource pool and announces discovery message;
  The UE can announce discovery message on a randomly selected discovery resource during each discovery period.

Scheduled resource allocation: A resource allocation procedure where resources for announcing of discovery message are allocated on per UE specific basis, further characterized by:
  The UE in RRC_CONNECTED may request resource(s) for announcing of discovery message from the eNB via RRC;
  The eNB assigns resource(s) via RRC;
  The resources are allocated within the resource pool that is configured in UEs for announcement.

For UEs in RRC_IDLE:
  The eNB may select one of the following options:
    The eNB may provide a resource pool for UE autonomous resource selection based discovery message announcement in SIB 19. UEs that are authorized for Prose Direct Discovery use these resources for announcing discovery message in RRC_IDLE;
    The eNB may indicate in SIB 19 that it supports ProSe Direct Discovery but does not provide resources for discovery message announcement. UEs need to enter RRC_CONNECTED in order to request resources for discovery message announcement.

For UEs in RRC_CONNECTED:
  A UE authorized to perform ProSe Direct Discovery announcement indicates to the eNB that it wants to perform ProSe Direct Discovery announcement;
  The eNB validates whether the UE is authorized for ProSe Direct Discovery announcement using the UE context received from MME;
  The eNB may configure the UE with resource pool for UE autonomous resource selection for discovery message announcement via dedicated signalling;
  The eNB may configure resource pool along with dedicated resource in the form of time and frequency indices for discovery message announcement via dedicated RRC signalling;
  The resources allocated by the eNB via dedicated signalling are valid until;
    The eNB re-configures the resource(s) by RRC signalling or;
    The UE enters RRC_IDLE.

Authorised receiving UEs in RRC_IDLE and RRC_CONNECTED monitor resource pools used for UE autonomous resource selection and resource pools for scheduled resource allocation. The eNB provides the resource pool configuration used for discovery message monitoring in SIB 19. The SIB 19 may contain detailed ProSe Direct Discovery configuration used for announcing in neighbour cells of intra-frequency as well.

Synchronous and asynchronous deployments are supported. Discovery resources can be overlapping or non-overlapping across cells.

A UE if authorised by the NW can announce discovery message only on serving cell. The UE can monitor discovery resources in the same as well as other frequencies than the serving cell, in same or different PLMNs.
  The serving cell may provide in SIB 19 a list of frequencies along with PLMN ID on which the UE may aim to monitor discovery message;
  The serving cell does not provide detailed ProSe Discovery configuration for other carrier frequencies. The UE may read SIB 19 and other relevant SIBs on other carriers if it wants to perform discovery message monitoring on those carriers;
    Obtaining ProSe Direct Discovery configuration by reading SIB 19 (and other SIBs) of an inter-frequency and/or inter-PLMN cell may not affect the UE's Uu reception on the serving cell(s);
  The UE performs intra-frequency ProSe Direct Discovery announcement in subframes in which a ProSe Direct Discovery resource pool is configured and the UE is not expected to perform uplink Uu transmission;
    The UE may not create autonomous gaps.
  Intra-frequency, inter-frequency and inter-PLMN ProSe Direct Discovery monitoring may not affect Uu reception.
    The UE uses DRX occasions in RRC_IDLE and RRC_CONNECTED or second RX chain if it is available, for intra-frequency, inter-frequency and inter-PLMN discovery message monitoring;
    The UE may not create autonomous gaps.
  An RRC_CONNECTED UE sends a ProSe UE Information indication to the serving cell if it is interested or no longer interested in intra-frequency, inter-frequency or inter-PLMN discovery message monitoring.

The sidelink direct discovery for the in coverage discovery scenario may also follows the following procedure.

14 UE procedures related to Sidelink

A UE can be configured by higher layers with one or more PSDCH resource configuration(s). A PSDCH resource configuration can be for reception of PSDCH, or for transmission of PSDCH. The transmissions of PSDCH according to a PSDCH resource configuration are associated with either sidelink discovery type 1 or sidelink discovery type 2B. The physical sidelink discovery channel related procedures are described in subclause 14.3.

14.3 Physical Sidelink Discovery Channel Related Procedures 14.3.1 UE Procedure for Transmitting the PSDCH If a UE is configured by higher layers to transmit PSDCH according to a PSDCH resource configuration, in a PSDCH period i,
  the number of transmissions for a transport block on PSDCH is $N_{SLD}^{TX}=n+1$ where n is given by the higher layer parameter discoveryNumRetx, and each transmission corresponds to one subframe belonging to a set of subframes, and in each subframe, the PSDCH is transmitted on two physical resource blocks per slot.
  for sidelink discovery type 1,
    the allowed values for PSDCH resource selection are given by 0, 1 ... $(N_t \cdot N_f - 1)$, where $N_t = \lfloor L_{PSDCH}/N_{SLD}^{TX} \rfloor$ and $N_f = \lfloor M_{RB}^{PSDCH\_RP}/2 \rfloor$, and the j-th transmission ($1 \leq j \leq N_{SLD}^{TX}$) for the transport block occurs in contiguous resource blocks $m_{2 \cdot a_j^{(i)}}$ and $m_{2 \cdot a_j^{(i)}+1}$ of subframe $l_{N_{SLD}^{TX} \cdot b_1^{(i)} \cdot j-1}$ of the PSDCH period, where $a_j^{(i)} = ((j-1) \cdot \lfloor N_f/N_{SLD}^{TX} \rfloor + \lfloor n_{PSDCH}/N_t \rfloor) \mod N_f$ and $b_1^{(i)} = n_{PSDCH} \mod N_t$ and using selected resource value $n_{PSDCH}$ (described in [8]).

$(l_0^{PSDCH}, l_1^{PSDCH}, \ldots, l_{L_{PSDCH}-1}^{PSDCH})$, $(m_0^{PSDCH}, m_1^{PSDCH}, \ldots, m_{M_{RB}^{PSDCH\_RP}-1}^{PSDCH})$, $L_{PSDCH}$ and $M_{RB}^{PSDCH\_RP}$ are described in subclause 14.3.3.
for sidelink discovery type 2B,
The j-th transmission ($1 \leq j \leq N_{SLD}^{TX}$) for the transport block occurs in contiguous resource blocks $m_{2 \cdot a_j^{(i)}}^{PSDCH}$ and $m_{2 \cdot a_j^{(i)}+1}$ of subframe $l_{N_{SLD}^{TX} \cdot b_1^{(i)}+j-1}$ of the PSDCH period, where $a_1^{(i)} = (N_{PSDCH}^{(2)} + n') \mod 10 + \lfloor (a_1^{(i-1)} + N_f b_1^{(i-1)})/N_t \rfloor) \mod N_f$ $b_1^{(i)} = (N_{PSDCH}^{(1)} + N_{PSDCH}^{(3)} \cdot a_1^{(i-1)} + N_f b_1^{(i-1)}) \mod N_t$ $a_j^{(i)} = ((j-1) \cdot \lfloor N_f/N_{SLD}^{TX} \rfloor + a_1^{(i)}) \mod N_f$ for $1 < j \leq N_{SLD}^{TX}$ $N_t = \lfloor L_{PSDCH}/N_{SLD}^{TX} \rfloor$ and $N_f = \lfloor M_{RB}^{PSDCH\_RP}/2 \rfloor$, and $(l_0^{PSDCH}, l_1^{PSDCH}, \ldots, l_{L_{PSDCH}-1}^{PSDCH})$, $(m_0^{PSDCH}, m_1^{PSDCH}, \ldots, m_{M_{RB}^{PSDCH\_RP}-1}^{PSDCH})$, $L_{PSDCH}$ and $M_{RB}^{PSDCH\_RP}$ are described in subclause 14.3.3.
$a_1^{(0)}$ and $b_1^{(0)}$ are given by higher layer parameters nfType2BDiscovery and ntType2BDiscovery, respectively and that associated with the PSDCH resource configuration.
$N_{PSDCH}^{(1)}$, $N_{PSDCH}^{(2)}$ and $N_{PSDCH}^{(3)}$ are given by higher layer parameters aType2BDiscovery, bDashType2BDiscovery, and cType2BDiscovery, respectively and that are associated with the PSDCH resource configuration.
n' is the number of PSDCH periods since $N_{PSDCH}^{(2)}$ was received.
the transport block size is 232
For sidelink discovery, the UE transmit power $P_{PSDCH}$ is given by the following $P_{PSDCH} = \min\{P_{CMAX,PSDCH}, 10 \log_{10}(M_{PSDCH}) + P_{O\_PSDCH,1} + \alpha_{PSDCH,1} \cdot PL\}$ [dBm]

where $P_{CMAX,PSDCH}$ is defined in [6], and $M_{PSDCH} = 2$ and $PL = PL_c$ where $PL_c$ is defined in subclause 5.1.1.1. $P_{O\_PSDCH,1}$ and $\alpha_{PSDCH,1}$ are provided by higher layer parameters discoveryPo and discoveryAlpha, respectively and are associated with the corresponding PSDCH resource configuration.

A UE may drop any PSDCH transmissions that are associated with sidelink discovery type 1 in a sidelink subframe if the UE has a PSDCH transmission associated with sidelink discovery type 2B in that subframe.

14.3.2 UE Procedure for Receiving the PSDCH

For sidelink discovery type 1, for each PSDCH resource configuration associated with reception of PSDCH, a UE configured by higher layers to detect a transport block on PSDCH can decode the PSDCH according to the PSDCH resource configuration.

For sidelink discovery type 2B, for each PSDCH resource configuration associated with reception of PSDCH, a UE configured by higher layers to detect a transport block on PSDCH can decode the PSDCH according to the PSDCH resource configuration.

14.3.3 UE Procedure for Determining Resource Block Pool and Subframe Pool for Sidelink Discovery A PSDCH resource configuration for transmission/reception is associated with a set of periodically occurring time-domain periods (known as PSDCH periods). The i-th PSDCH period begins at subframe with subframe index $j_{begin} = O_3 + i \cdot P$ and ends in subframe with subframe index $j_{end} = O_3 + (i+1) \cdot P - 1$, where $0 \leq j_{begin} < 10240$, the subframe index is relative to subframe#0 of a radio frame corresponding to SFN 0 of the serving cell or DFN 0 (described in [11]), $O_3$ is the discoveryOffsetIndicator indicated by the PSDCH resource configuration P is the discoveryPeriod indicated by the PSDCH resource configuration.

For a PSDCH period, the UE determines a discovery pool consisting of a subframe pool and a resource block pool for PSDCH as follows.

For TDD, if the parameter tddConfig is indicated by the PSDCH resource configuration, the TDD UL/DL configuration used for determining the subframe pool is given by the parameter tddConfig, otherwise, the TDD UL/DL configuration used for determining the subframe pool is given by the UL/DL configuration (i.e. parameter subframeAssignment) for the serving cell.

A bitmap $b_0, b_1, b_2, \ldots, b_{N'-1}$ is obtained using $b_j = a_{j \mod N_B}$, for $0 \leq j < N'$, where $a_0, a_1, a_2, \ldots, a_{N_B-1}$ and $N_B$ are the bitmap and the length of the bitmap indicated by discoverySubframeBitmap, respectively, and $N' = N_B \cdot N_R$, where $N_R$ is the discoveryNumRepetition indicated by the PSDCH resource configuration.

The first N' uplink subframes are denoted by $(l_0, l_1, \ldots, l_{N'-1})$ arranged in increasing order of subframe index.

A subframe $l_j$ ($0 \leq j < N'$) belongs to the subframe pool if $b_j = 1$. The subframes in the subframe pool are denoted by $(l_0^{PSDCH}, l_1^{PSDCH}, \ldots, l_{L_{PSDCH}-1}^{PSDCH})$ arranged in increasing order of subframe index and $L_{PSDCH}$ denotes the number of subframes in the subframe pool.

A PRB with index q ($0 \leq q < N_{RB}^{SL}$) belongs to the resource block pool if $S1 \leq q < S1 + M$ or if $S2 - M < q \leq S2$, where S1, S2, and M denote the discoveryStartPRB, discoveryEndPRB and discoveryNumPRB indicated by the PSDCH resource configuration respectively.

The resource blocks in the resource block pool are denoted by $$\left(m_0^{PSDCH}, m_1^{PSDCH}, \ldots, m_{M_{RB}^{PSDCH\_RP}-1}^{PSDCH}\right)$$

arranged in increasing order of resource block indices and $M_{RB}^{PSDCH\_RP}$ is the number of resource blocks in the resource block pool.

The sidelink direct discovery for the in coverage discovery scenario may also follows the following procedure.

5.2.2.x2 Actions upon reception of SystemInformationBlockType19

Upon receiving SystemInformationBlockType19, the UE may:

1> if SystemInformationBlockType19 message includes the discConfig:
  2> from the next discovery period, as defined by discPeriod, use the resources indicated by discRxPool for sidelink direct discovery monitoring, as specified in 5.X.5;
  2> if SystemInformationBlockType19 message includes the discTxPoolCommon; and the UE is in RRC_IDLE:
    3> from the next discovery period, as defined by discPeriod, use the resources indicated by discTxPoolCommon for sidelink direct discovery announcement, as specified in 5.X.6;
  2> if the SystemInformationBlockType19 message includes the discTxPowerInfo:
    3> use the power information included in discTxPowerInfo for sidelink direct discovery transmission, as specified in TS 36.213 [23];

5.3.3.1a Conditions for Establishing RRC Connection for Sidelink Direct Communication/Discovery Upper layers initiate an RRC connection for sidelink direct communication only in the following case:

1> if configured by upper layers to transmit sidelink direct communication and related data is available for transmission:
  2> ifSystemInformationBlockType18 is broadcast by the cell on which the UE camps; and if the valid version of SystemInformationBlockType18 does not include commTxPoolNormalCommon;

Upper layers initiate an RRC connection for sidelink direct discovery only in the following case:

1> if configured by upper layers to transmit sidelink direct discovery announcements:
  2> ifSystemInformationBlockType19 is broadcast by the cell on which the UE camps: and if the valid version of SystemInformationBlockType19 does not include discTxPoolCommon;

NOTE: The interaction with NAS is left to UE implementation.

5.3.10.x Sidelink Dedicated Configuration

The UE may:

1> if the RRCConnectionReconfiguration message includes the sl-CommConfig:
  2> if commTxResources is included and set to setup:
    3> from the next SC period use the resources indicated by commTxResources for sidelink direct communication transmission, as specified in 5.X.4;
  2> else if commTxResources is included and set to release:
    3> from the next SC period, release the resources allocated for sidelink direct communication transmission previously configured by commTxResources;

1> if the RRCConnectionReconfiguration message includes the sl-DiscConfig:
  2> if discTxResources is included and set to setup:
    3> from the next discovery period, as defined by discPeriod, use the resources indicated by discTxResources for sidelink direct discovery announcement, as specified in 5.X.6;
  2> else if discTxResources is included and set to release:
    3> from the next discovery period, as defined by discPeriod, release the resources allocated for sidelink direct discovery announcement previously configured by discTxResources;

5.x Sidelink

5.X.1 Introduction

The sidelink direct communication/discovery/synchronisation resource configuration applies for the frequency at which it was received/acquired. Moreover, for a UE configured with one or more SCells, the sidelink direct communication/discovery/synchronisation resource configuration provided by dedicated signalling applies for the PCell/the primary frequency. Furthermore, the UE may not use the sidelink direct communication/discovery/synchronisation transmission resources received in one cell with the timing of another cell.

NOTE 1: Upper layers configure the UE to receive or transmit sidelink direct communication on a specific frequency, to monitor sidelink direct discovery announcements on one or more frequencies or to transmit sidelink direct discovery announcements on a specific frequency, but only if the UE is authorised to perform these particular ProSe related sidelink activities.

NOTE 2: It is up to UE implementation which actions to take (e.g. termination of unicast services, detach) when it is unable to perform the desired sidelink activities, e.g. due to UE capability limitations.

5.X.1a Conditions for sidelink operation

The UE may perform sidelink operation only if the following conditions are met:

1> if the UE's serving cell is suitable (RRC_IDLE or RRC_CONNECTED); or
1> if the UE's serving cell fulfils the conditions to support sidelink direct communication in limited service state as specified in TS 23.303 [N, 4.5.6] and the UE is in RRC_IDLE:
1> if the UE has no serving cell (RRC_IDLE);

5.X.2 Sidelink UE Information

5.X.2.1 General

The purpose of this procedure is to inform E-UTRAN that the UE is interested or no longer interested to receive sidelink direct communication or discovery, as well as to request assignment or release of transmission resources for sidelink direct communication or discovery announcements.

5.X.2.2 Initiation

A UE capable of sidelink direct communication or discovery that is in RRC_CONNECTED may initiate the procedure to indicate it is (interested in) receiving sidelink direct communication or discovery in several cases including upon successful connection establishment, upon change of interest, upon change to a PCell broadcasting SystemInformationBlockType18 or SystemInformationBlockType19. A UE capable of sidelink direct communication or discovery may initiate the procedure to request assignment of dedicated resources for the concerned sidelink direct communication transmission or discovery announcements.

NOTE 1: A UE in RRC_IDLE that is configured to transmit sidelink direct communication/discovery announcements, while SystemInformationBlockType18/SystemInformationBlockType19 does not include the resources for transmission (in normal conditions), initiates connection establishment in accordance with 5.3.3.1a.

Upon initiating the procedure, the UE may:
1> if SystemInformationBlockType18 is broadcast by the PCell:
  2> ensure having a valid version of SystemInformationBlockType18 for the PCell;
  2> if configured by upper layers to receive sidelink direct communication:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType18; or NOTE 2: After handover/re-establishment from a source PCell not broadcasting SystemInformationBlockType18 the UE repeats the same interest information that it provided previously as such a source PCell may not forward the interest information.

3> if the last transmission of the SidelinkUEInformation message did not include commRxInterestedFreq; or if the frequency configured by upper layers to receive sidelink direct communication on has changed since the last transmission of the SidelinkUEInformation message:
      4> initiate transmission of the SidelinkUEInformation message to indicate the sidelink direct communication reception frequency of interest in accordance with 5.x.2.3;
  2> else:
    3> if the last transmission of the SidelinkUEInformation message included commRxInterestedFreq:
      4> initiate transmission of the SidelinkUEInformation message to indicate it is no longer interested in sidelink direct communication reception in accordance with 5.x.2.3;
  2> if configured by upper layers to transmit sidelink direct communication:
    3> if the UE did not transmit a SidelinkUEInformation message since entering RRC_CONNECTED state; or
    3> if since the last time the UE transmitted a SidelinkUEInformation message the UE connected to a PCell not broadcasting SystemInformationBlockType18; or
    3> if the last transmission of the SidelinkUEInformation message did not include commTxResourceReq; or if the information carried by the commTxResourceReq has changed since the last transmission of the SidelinkUEInformation message:
      4> initiate transmission of the SidelinkUEInformation message to indicate the sidelink direct communication transmission resources required by the UE in accordance with 5.x.2.3;
  2> else:
    3> if the last transmission of the SidelinkUEInformation message included commTxResourceReq:
      4> initiate transmission of the SidelinkUEInformation message to indicate it does no longer require sidelink direct communication transmission resources in accordance with 5.x.2.3;
1> if SystemInformationBlockType19 is broadcast by the PCell:
  2> ensure having a valid version of SystemInformationBlockType19 for the PCell;
  2> if configured by upper layers to receive sidelink direct discovery announcements on a serving frequency or on one or more frequencies included in discInterFreqList, if included in SystemInformationBlockType19:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType19; or
    3> if the last transmission of the SidelinkUEInformation message did not include discRxInterest:
      4> initiate transmission of the SidelinkUEInformation message to indicate it is interested in sidelink direct discovery reception in accordance with 5.x.2.3;
  2> else:
    3> if the last transmission of the SidelinkUEInformation message included discRxInterest:
      4> initiate transmission of the SidelinkUEInformation message to indicate it is no longer interested in sidelink direct discovery reception in accordance with 5.x.2.3;
  2> if the UE is configured by upper layers to transmit sidelink direct discovery announcements:
    3> if the UE did not transmit a SidelinkUEInformation message since entering RRC_CONNECTED state; or
    3> if since the last time the UE transmitted a SidelinkUEInformation message the UE connected to a PCell not broadcasting SystemInformationBlockType19; or
    3> if the last transmission of the SidelinkUEInformation message did not include discTxResourceReq; or if the direct discovery announcement resources required by the UE have changed (i.e. resulting in a change of discTxResourceReq) since the last transmission of the SidelinkUEInformation message:
      4> initiate transmission of the SidelinkUEInformation message to indicate the sidelink direct discovery announcement resources required by the UE in accordance with 5.x.2.3;
  2> else:
    3> if the last transmission of the SidelinkUEInformation message included discTxResourceReq:
      4> initiate transmission of the SidelinkUEInformation message to indicate it does no longer require sidelink direct discovery announcement resources in accordance with 5.x.2.3;

5.X.2.3 Actions Related to Transmission of SidelinkUEInformation Message

The UE may set the contents of the SidelinkUEInformation message as follows:
1> if SystemInformationBlockType18 is broadcast by the PCell:
  2> if configured by upper layers to receive sidelink direct communication:

3> include commRxInterestedFreq and set it to the sidelink direct communication frequency;
2> if configured by upper layers to transmit sidelink direct communication:
3> include commTxResourceReq and set its fields as follows:
4> set carrierFreq to indicate the sidelink direct communication frequency i.e. the same value as indicated in commRxInterestedFreq if included;
4> set destinationInfoList to include the sidelink direct communication transmission destination(s) for which it requests E-UTRAN to assign dedicated resources;
1> if SystemInformationBlockType19 is broadcast by the PCell:
2> if configured by upper layers to receive sidelink direct discovery announcements on a serving frequency or one or more frequencies included in discInterFreqList, if included in SystemInformationBlockType19:
3> include discRxInterest;
2> if the UE is configured by upper layers to transmit sidelink direct discovery announcements:
3> include discTxResourceReq and set it to indicate the number of resources for sidelink direct discovery announcement for which it requests E-UTRAN to assign dedicated resources;

The UE may submit the SidelinkUEInformation message to lower layers for transmission.

5.X.5 Direct Discovery Monitoring

A UE capable of sidelink direct discovery that is configured by upper layers to monitor sidelink direct discovery announcements may:
1> for each frequency the UE is configured to monitor sidelink direct discovery announcements on, prioritising the frequencies included in discInterFreqList, if included in SystemInformationBlockType19:
2> configure lower layers to monitor sidelink direct discovery announcements using the pool of resources indicated by discRxPool in SystemInformationBlockType19 without affecting normal operation i.e. receive during idle periods or by using a spare receiver;
NOTE 1: The requirement not to affect normal UE operation also applies for the acquisition of sidelink discovery related system and synchronisation information from inter-frequency cells.
NOTE 2: The UE is not required to monitor all pools simultaneously.
NOTE 3: It is up to UE implementation to decide whether a cell is sufficiently good to be used to monitor sidelink direct discovery announcements.
NOTE 4: If discRxPool includes one or more entries including rxParameters, the UE may only monitor such entries if the associated SLSSIDs are detected. When monitoring such pool(s) the UE applies the timing of the corresponding SLSS.

5.X.6 Direct Discovery Announcement

A UE capable of sidelink direct discovery that is configured by upper layers to transmit sidelink direct discovery announcements may:
NOTE 1: In case the configured resources are insufficient it is up to UE implementation to decide which sidelink direct discovery announcements to transmit.
1> if the UE's serving cell (RRC_IDLE) or PCell (RRC_CONNECTED) is suitable as defined in TS 36.304 [4]:
2> if the UE is in RRC_CONNECTED (i.e. PCell is used for sidelink direct discovery announcement):
3> if the UE is configured with discTxResources set to scheduled:
4> configure lower layers to transmit the sidelink direct discovery announcement using the assigned resources indicated by scheduled in discTxResources:
3> else if the UE is configured with discTxPoolDedicated (i.e. discTxResources set to ue-Selected):
4> if poolSelection within poolToAddModList is set to rsrpBased:
5> select an entry of poolToAddModList for which the RSRP measurement of the PCell, after applying the layer 3 filter defined by quantityConfig as specified in 5.5.3.2, is in-between threshLow and threshHigh:
4> else:
5> randomly select, using a uniform distribution, an entry of poolToAddModList:
4> configure lower layers to transmit the sidelink direct discovery announcement using the selected pool of resources:
2> else if T300 is not running (i.e. UE in RRC_IDLE, announcing via serving cell):
3> if SystemInformationBlockType19 of the serving cell includes discTxPoolCommon:
4> if poolSelection is set to rsrpBased:
5> select an entry of discTxPoolCommon for which RSRP measurement of the serving cell is in-between threshLow and threshHigh:
4> else:
5> randomly select, using a uniform distribution, an entry of discTxPoolCommon:
4> configure lower layers to transmit the sidelink direct discovery announcement using the selected pool of resources;
NOTE 2: When performing resource pool selection based on RSRP, the UE uses the latest results of the available measurements used for cell reselection evaluation in RRC_IDLE/for measurement report triggering evaluation in RRC_CONNECTED, which are performed in accordance with the performance requirements specified in TS 36.133 [16].

9.x Sidelink Pre-Configured Parameters 9.x.1 Specified Parameters

This section only list parameters which value is specified in the standard.

Parameters

| Name | Value | Semantics description | Ver |
|---|---|---|---|
| preconfigSync | | | |
| >syncTxParameters | | | |
| >>alpha | | 0 | |
| PreconfigComm | | | |
| >sc-TxParameters | | | |
| >>alpha | | 0 | |
| >dataTxParameters | | | |
| >>alpha | | 0 | |

9.x.2 Pre-Configurable Parameters

This ASN.1 segment is the start of the E-UTRA definitions of pre-configured sidelink parameters.

NOTE 1: Upper layers are assumed to provide a set of pre-configured parameters that are valid at the current UE location if any, see TS 24.334 [M, 10.2].

```
-- ASN1START
EUTRA-Sidelink-Preconf DEFINITIONS AUTOMATIC TAGS ::=
BEGIN
IMPORTS
        AdditionalSpectrumEmission,
        ARFCN-ValueEUTRA-r9,
        FilterCoefficient,
        maxSL-TxPool-r12,
        P-Max,
        SL-CP-Len-r12,
        SL-HoppingConfigComm-r12,
        SL-OffsetIndicatorSync-r12,
        SL-PeriodComm-r12,
        RSRP-RangeSL3-r12,
        SL-TF-ResourceConfig-r12,
        SL-TRPT-Subset-r12,
        P0-SL-r12,
        TDD-ConfigSL-r12
FROM EUTRA-RRC-Definitions;
-- ASN1STOP
```

SL-Preconfiguration

The IE SL-Preconfiguration includes the sidelink pre-configured parameters.

SL-Preconfiguration Information Elements

```
-- ASN1START
SL-Preconfiguration-r12 ::=        SEQUENCE {
    preconfigGeneral-r12            SL-PreconfigGeneral-r12,
    preconfigSync-r12               SL-PreconfigSync-r12,
    preconfigComm-r12               SL-PreconfigCommPoolList4-r12,
    ...
}
SL-PreconfigGeneral-r12 ::=        SEQUENCE {
    -- PDCP configuration
    rohc-Profiles-r12                   SEQUENCE {
        profile0x0001                       BOOLEAN,
        profile0x0002                       BOOLEAN,
        profile0x0004                       BOOLEAN,
        profile0x0006                       BOOLEAN,
        profile0x0101                       BOOLEAN,
        profile0x0102                       BOOLEAN,
        profile0x0104                       BOOLEAN
    },
    -- Physical configuration
    carrierFreq-r12                     ARFCN-ValueEUTRA-r9,
    maxTxPower-r12                      P-Max,
    additionalSpectrumEmission-r12      AdditionalSpectrumEmission,
    sl-bandwidth-r12                    ENUMERATED {n6, n15, n25, n50, n75, n100},
    tdd-ConfigSL-r12                    TDD-ConfigSL-r12,
    reserved-r12                        BIT STRING (SIZE (19)),
    ...
}
SL-PreconfigSync-r12 ::=        SEQUENCE {
    syncCP-Len-r12                      SL-CP-Len-r12,
    syncOffsetIndicator1-r12            SL-OffsetIndicatorSync-r12,
    syncOffsetIndicator2-r12            SL-OffsetIndicatorSync-r12,
    syncTxParameters-r12                P0-SL-r12,
    syncTxThreshOoC-r12                 RSRP-RangeSL3-r12,
    filterCoefficient-r12               FilterCoefficient,
    syncRefMinHyst-r12                  ENUMERATED (dB0, dB3, dB6, dB9, dB12},
    syncRefDiffHyst-r12                 ENUMERATED {dB0, dB3, dB6, dB9, dB12, dBinf},
    ...
}
SL-PreconfigCommPoolList4-r12 ::=        SEQUENCE (SIZE (1..maxSL-TxPool-r12))
    OF SL-PreconfigCommPool-r12
SL-PreconfigCommPool-r12 ::=        SEQUENCE {
-- This IE is same as SL-CommResourcePool with rxParametersNCell absent
    sc-CP-Len-r12                       SL-CP-Len-r12,
    sc-Period-r12                       SL-PeriodComm-r12,
    sc-TF-ResourceConfig-r12            SL-TF-ResourceConfig-r12,
    sc-TxParameters-r12                 P0-SL-r12,
    data-CP-Len-r12                     SL-CP-Len-r12,
    data-TF-ResourceConfig-r12          SL-TF-ResourceConfig-r12,
    dataHoppingConfig-r12               SL-HoppingConfigComm-r12,
    dataTxParameters-r12                P0-SL-r12,
    trpt-Subset-r12                     SL-TRPT-Subset-r12,
    ...
}
END
-- ASN1STOP
```

| Preconfiguration field descriptions |
| --- |
| CarrierFreq |
| Indicates the carrier frequency for sidelink operation. In case of FDD it is uplink carrier frequency and the corresponding downlink frequency can be determined from the default TX-RX frequency separation defined in TS 36.101 [42, table 5.7.3-1]. |
| PreconfigComm |
| Indicates a list of a number of individual resource pools. The same set of pools is used for for reception and transmission of sidelink direct communication. |
| SyncRefDiffHyst |
| Hysteresis when evaluating a SyncRef UE using relative comparison. Value dB0 corresponds to 0 dB, dB3 to 3 dB and so on, value dBinf corresponds to infinite dB. |
| SyncRefMinHyst |
| Hysteresis when evaluating a SyncRef UE using absolute comparison. Value dB0 corresponds to 0 dB, dB3 to 3 dB and so on. |

The sidelink direct discovery for the in coverage discovery scenario may also follows the following procedure.

5.3 ProSe Direct Discovery 5.3.1 General 5.3.1.1 Overview

ProSe Direct Discovery is defined as the process that detects and identifies another UE in proximity using E-UTRA direct radio signals.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g. "find a taxi nearby", "find me a coffee shop". Additionally depending on the information obtained ProSe Direct Discovery can be used for subsequent actions e.g. to initiate ProSe Direct Communication.

The UE can act as "announcing UE" only in the band designated by the serving PLMN but may act as a "monitoring" UE also in the resources of the serving PLMN and Local PLMNs.

ProSe-enabled non-Public Safety UEs which have obtained authorization to participate in ProSe Direct Discovery procedures may not continue in participating in ProSe Direct Discovery procedures as soon as they detect loss of E-UTRA coverage in the serving PLMN.

5.3.1.2 ProSe Direct Discovery Models

The following models for ProSe Direct Discovery exist:

Model A ("I am here")

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them.

NOTE: This model is equivalent to "I am here" since the announcing UE would broadcast information about itself e.g. its ProSe Application Code in the discovery message.

Model B ("who is there?"/"are you there?")

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It is equivalent to "who is there/are you there" since the discoverer UE sends information about other UEs that would like to receive responses from, e.g. the information can be about a ProSe Application Identity corresponding to a group and the members of the group can respond The discovery may be extended to out OOC scenario, at least for public safety applications. Therefore, how in coverage UEs capable of sidelink direct discovery can discover UEs or be discovered by out-of-coverage UEs, and how the out-of-coverage UEs capable of sidelink direct discovery can discover each other needs to be resolved, especially considering direct discovery is normally performed frequency by frequency.

The technology disclosed herein concerns, e.g., providing a radio resource pool including a radio resource for a wireless terminal to use for sidelink direct discovery when the wireless terminal is either in a partial coverage discovery scenario or an out-of-coverage discovery scenario. As mentioned above, an example of the partial coverage discovery scenario is illustrated in FIG. 1 with reference to wireless terminal UE2 and wireless terminal UE3; an example of the out-of-coverage discovery scenario is illustrated in FIG. 1 with reference to wireless terminal UE3 and wireless terminal UE4.

As used herein, a radio resource "pool" may comprise one radio resource pool or plural radio resource pools. Hence, "pool" is understood to include "pools" and thus also to mean or be denoted as "pool(s)".

Frequency" is one kind of "resource(s)". Normally in LTE "resources" mean resource blocks (RBs) in both time and frequency domains. While resource pools mean some RBs with specifically defined ranges (time and/or frequency) for some particular usage, e.g., transmission resource pool, which may include, e.g., resource pool 1 which is specially for mode 1 transmission in the cell, resource pool 2 which is specially for mode 2 transmission in the cell, resource pool 3 which is specially for mode 2 transmission in the intra-frequency adjacent cell. As used herein, "monitoring resource pools with indicated frequency from higher layer" or similar language means the resource pools are designed especially for one cell or some intra-frequency cells. If there is no "indicated frequency from higher layer", the wireless terminal may have to monitor all resource pools in its list, or may monitor some of resource pools in its list according to some priority rules due to implementation issue, such resource pools may or may not cover the "indicated frequency".

Figure 2:
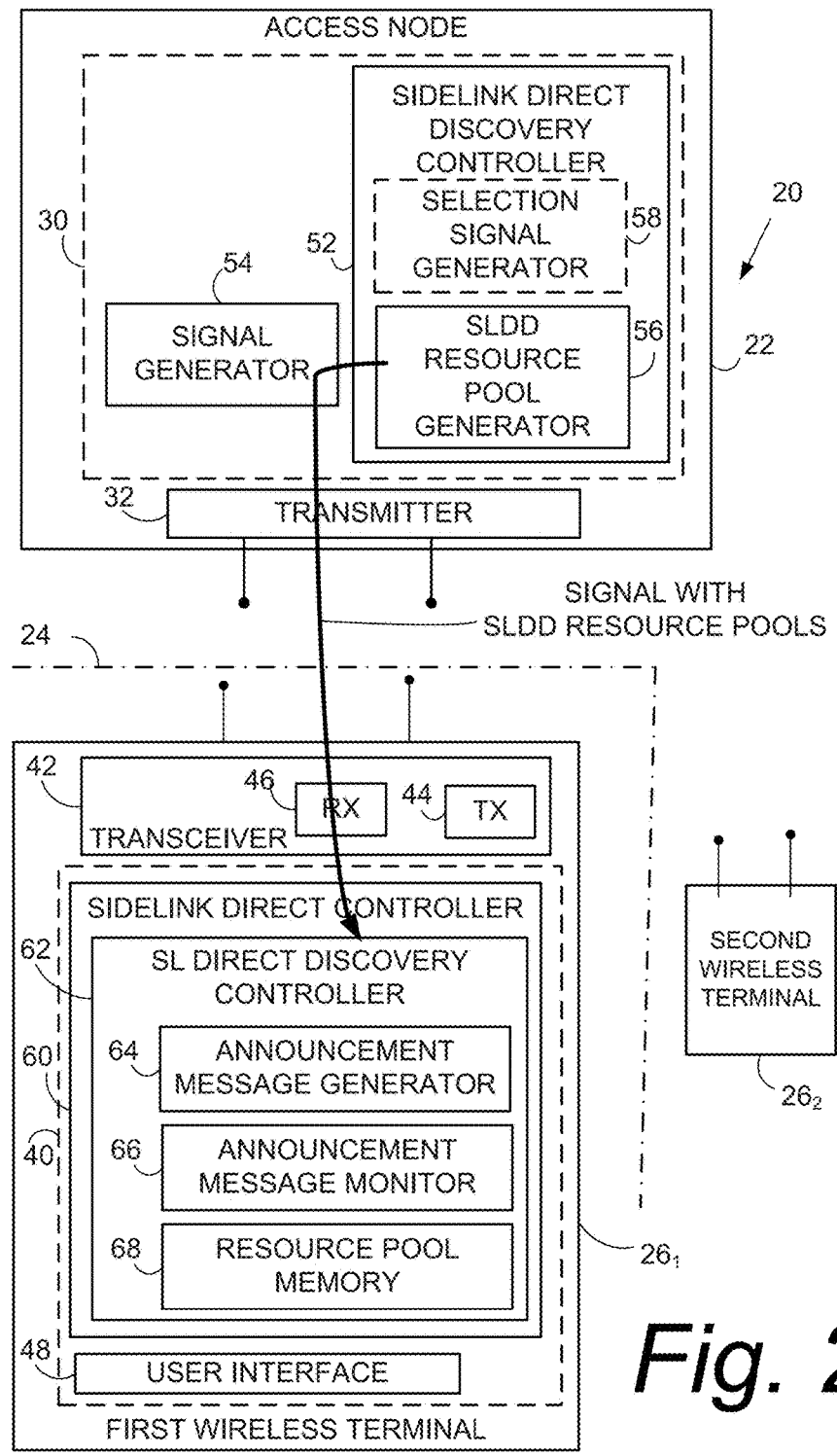
FIG. 2 is a schematic view of an example generic embodiment of a radio communications network in which a radio resource pool is provided for a wireless terminal which is either in a partial coverage sidelink direct discovery scenario or an out-of-coverage sidelink direct discovery scenario.

FIG. 2 shows an example communications system 20 wherein radio access node 22 communicates over air or radio interface 24 with first wireless terminal $26_1$. The wireless terminal $26_1$ may also participate over air or radio interface 24 in sidelink direct communications with other wireless terminals, such as second wireless terminal $26_2$. As used herein, radio interface 24 does not necessarily refer to any one protocol interface, since radio interface 24 may represent the Uu interface between wireless terminal 26 and radio access node 22 or may represent a PC5 interface between two wireless terminals. It will be understood that second wireless terminal $26_2$ may and like does include essentially the same units and functionalities as illustrated for wireless terminal $26_1$.

The node 22 comprises node processor 30 and node transmitter 32. The first wireless terminal $26_1$ comprises terminal processor 40 and terminal transceiver 42. The terminal transceiver 42 typically comprises terminal transmitter section 44 and terminal receiver section 46. The terminal transmitter section 44 may comprise terminal transmitter circuitry and may be known as "transmitter"; the terminal receiver section 46 may comprise terminal receiver circuitry and may be known as "receiver". FIG. 2 further shows wireless terminal $26_1$ as comprising terminal user interface 48. The terminal user interface 48 may serve for both user input and output operations, and may comprise (for example) a screen such as a touch screen that can both display information to the user and received information entered by the user.

In general operation node 22 and first wireless terminal $26_1$ communicate with each other across radio interface 24 using "frames" of information that are typically formatted and prepared by a scheduler of node 22. The frame may be configured to include various channels. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. In the time domain, each LTE subframe is divided into two slots (so that there are thus 20 slots in a frame). The transmitted signal in each slot is described by a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe S. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix. The frame and subframe structure serves only as an example of a technique of formatting of information that is to be transmitted over a radio or air interface. It should be understood that "frame" and "subframe" may even be utilized interchangeably or may include or be realized by other units of information formatting, and as such may bear other terminology (such as blocks, for example).

Since the technology disclosed herein concerns sidelink direct discovery, example units and functionalities pertaining to sidelink direct discovery are illustrated for both radio access node 22 and wireless terminal 26 in FIG. 2. It will be appreciated that typically a radio access node 22 and wireless terminal include numerous other units and functionalities such as those well known to the person skilled in the art.

In the above regard, FIG. 2 shows radio access node 22 as comprising node sidelink direct discovery controller 52 and node signal generator 54. Both node sidelink direct discovery controller 52 and node signal generator 54 may comprise the node processor 30. The sidelink direct discovery controller 52 in turn is shown as comprising sidelink direct discovery (SLDD) resource pool generator 56 and an optional selection signal generator 58.

FIG. 2 also shows wireless terminal $26_1$ as comprising terminal sidelink direct controller 60, which may comprise terminal processor 40. The terminal sidelink direct controller 60 supervises both sidelink communications and sidelink discovery, and in this latter regard comprises terminal sidelink direct discovery controller 62. The terminal sidelink direct discovery controller 62 in turn is shown as comprising, in an example embodiment, announcement message generator 64; announcement message monitor 66; and resource pool memory 68.

An in coverage wireless terminal obtains its resource pool list information from broadcast and dedicated RRC signaling. The radio resource pool information obtained by the wireless terminal while the wireless terminal is in coverage may be an in coverage-usable radio resource pool, an out-of-coverage usable radio resource pool, or a combination of in coverage usable radio resource pools and out-of-coverage usable radio resource pools. In the combination mode, preferably the in-coverage-usable radio resource pools are identified or differentiated differently from the out-of-coverage-usable radio resource pools.

When an in coverage wireless terminal goes out of coverage, it may operate in either of two alternative scenarios. As a first alternative scenario, the wireless terminal when out-of-coverage should not use the resource pool information received when in coverage any more, and should obtain out of coverage resource pool information through one or combinations of the three out-of-coverage pool obtaining techniques specified in United States Provisional application 62/145,492 filed on even date herewith as attorney docket 6112-23 and entitled "METHOD AND APPARATUS FOR SIDELINK DIRECT DISCOVERY RESOURCE POOL ALLOCATION FOR OUT-OF-COVERAGE WIRELESS TERMINAL". Those techniques include resource pool preconfiguration (Alt 1); resource pool indicated by PSBCH; and resource pool indicated by direct discovery signal (Atl 3).

As a second alternative scenario, the wireless terminal when out-of-coverage should may continue to use any out-of-coverage radio resource pool information that it received when in coverage for sake of discovery service continuity when of coverage. Preferably, once the out-of-coverage wireless terminal later receives further out-of-coverage resource pool information, e.g., through one or combinations of the three out-of-coverage pool obtaining techniques just mentioned, the out-of-coverage wireless terminal should stop using the resource pool information received when it was in coverage and start using the further and subsequently received out-of-coverage resource pool information.

Figure 3:
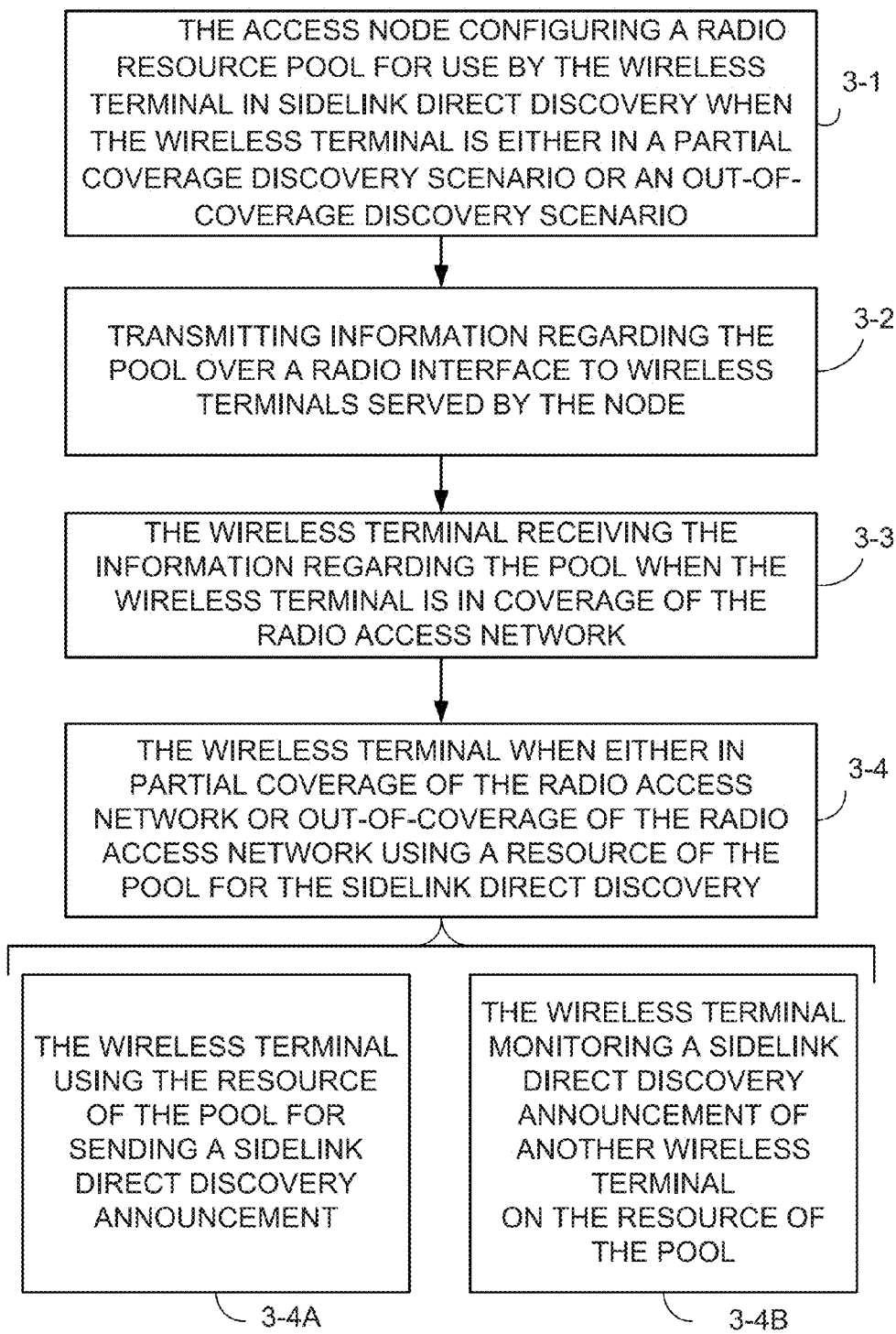
FIG. 3 is a flowchart which shows example, representative acts or steps involved in a method of operating the communications network of FIG. 2 including providing wireless terminal with a pool of radio resources for either in a partial coverage sidelink direct discovery scenario or an out-of-coverage sidelink direct discovery scenario.

FIG. 3 shows example, representative acts or steps involved in a method of operating the communications network 20 of FIG. 2 in accordance with the second alternative scenario described above. As shown in FIG. 2, the communications system 20 comprises radio access node 22 and wireless terminal $26_1$. Act 3-1 comprises the access node 22 (e.g., sidelink direct discovery (SLDD) resource pool generator 56) configuring a radio resource pool for use by the wireless terminal in sidelink direct discovery. If the radio resource pool includes an out-of-coverage radio resource pool(s), then the out-of-coverage radio resource pool(s) may be used, at least initially in accordance with Alternative 2 above, by the wireless terminal when the wireless terminal is either in a partial coverage discovery scenario or an out-of-coverage discovery scenario.

Act 3-2 comprises the radio access node 22 (e.g., node transmitter 32) transmitting information regarding the pool over a radio interface 24 to wireless terminals served by the node 22, e.g., to wireless terminal $26_1$ when wireless terminal $26_1$ is in coverage of radio access node 22. As used herein, "information regarding the pool" may comprise an identification of the pool or any information associated with the pool by which the pool may be identified. As indicated previously, the pool may comprise plural constituent pools, and thus the "information regarding the pool" may comprise a listing of such constituent pools or radio resources belonging to such pool(s).

Act 3-3 comprises the wireless terminal $26_1$ receiving the information regarding the pool which was transmitted in act 3-2. The wireless terminal $26_1$ is in a position to receive the information regarding the pool when the wireless terminal $26_1$ in coverage of the radio access network (e.g., the radio access network to which radio access node 22 or another node belongs).

Act 3-4 comprises wireless terminal $26_1$, when either in partial coverage of the radio access network or out-of-coverage of the radio access network, using an out-of-coverage resource of the pool for the sidelink direct discovery.

FIG. 3 further shows that the act 3-4 use of the pool for the sidelink direct discovery may take various forms. For example, act 3-4A comprises wireless terminal $26_1$ using the resource of the pool for sending a sidelink direct discovery announcement, and act 3-4B comprises wireless terminal $26_1$ monitoring a sidelink direct discovery announcement of another wireless terminal (e.g., of wireless terminal $26_2$) on the resource of the pool, e.g., listening on the allocated radio resource pool and then receiving the announcement when it is heard.

Figure 4:
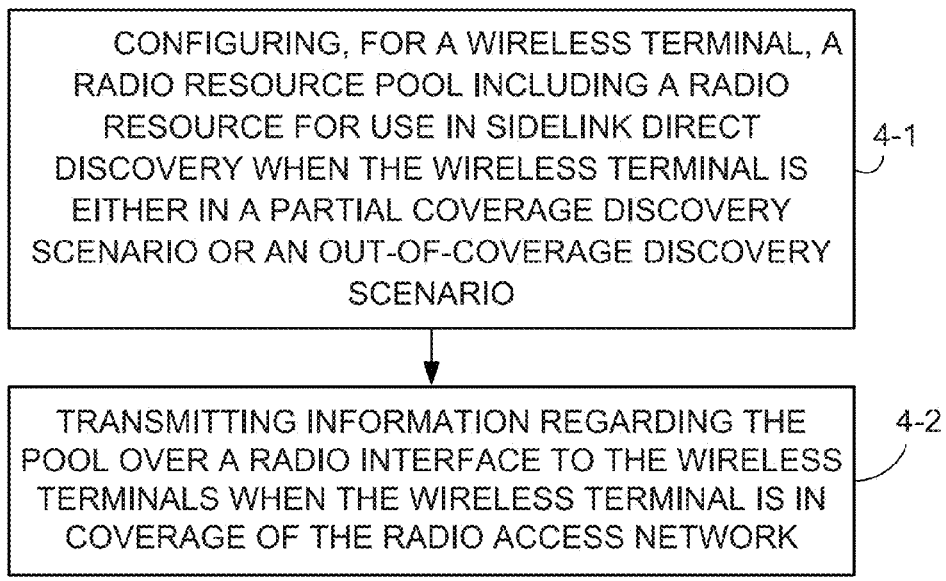
FIG. 4 is a flowchart showing example basic, representative acts or steps comprising a method of operating a radio access node according to an example embodiment and mode.

Some of the acts of FIG. 3 are performed by the radio access node 22. In this regard, in one of its aspects the technology disclosed herein concerns a method in a radio access node such as radio access node 22. FIG. 4 shows example basic, representative acts or steps comprising a method of operating a radio access node according to an example embodiment and mode. Act 4-1 comprises the radio access node 22 (e.g., sidelink direct discovery (SLDD) resource pool generator 56) configuring, for a wireless terminal such as wireless terminal $26_1$, a radio resource pool for use by wireless terminal $26_1$ in sidelink direct discovery. If the radio resource pool includes an out-of-coverage radio resource pool(s), such out-of-coverage radio resource pool may be used by the wireless terminal when the wireless terminal is either in a partial coverage discovery scenario or an out-of-coverage discovery scenario. Act 4-2 comprises the radio access node 22 (e.g., node transmitter 32) transmitting information regarding the pool over radio interface 24 to the wireless terminals when the wireless terminal is in coverage of the radio access network.

Figure 5:
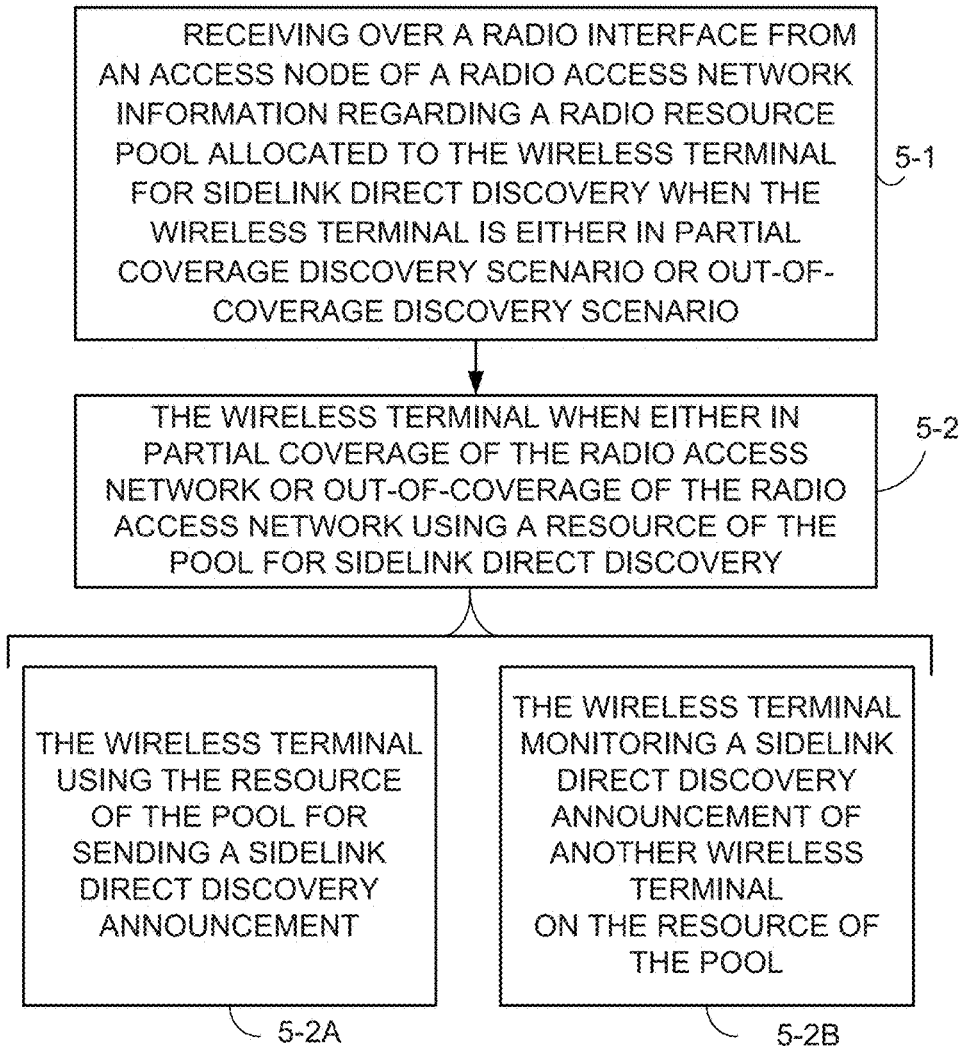
FIG. 5 is a flowchart showing example basic, representative acts or steps comprising a method of operating a wireless terminal according to an example embodiment and mode.

Some of the acts of FIG. 3 are performed by the wireless terminal. In this regard, in one of its aspects the technology disclosed herein concerns a method in a wireless terminal such as wireless terminal $26_1$. FIG. 5 shows example basic, representative acts or steps comprising a method of operating a wireless terminal according to an example embodiment and mode. Act 5-1 comprises the wireless terminal, when in coverage of radio access node 22, receiving over radio interface 24, from access node 22 of the radio access network, information regarding the radio resource pool allocated to the wireless terminal for sidelink direct discovery. As mentioned above, if the allocated radio resource pool includes an out-of-coverage radio resource pool, the out-of-coverage radio resource pool may be used by the wireless terminal when the wireless terminal is either in partial coverage discovery scenario or out-of-coverage discovery scenario. Act 5-1 may be performed by terminal transceiver 42 in conjunction with terminal sidelink direct discovery controller 62.

Act 5-2 comprises the wireless terminal, when either in partial coverage of the radio access network or out-of-coverage of the radio access network, using an out-of-coverage resource of the pool for sidelink direct discovery. Act 5-2 may be performed by terminal sidelink direct discovery controller 62 in conjunction with either terminal transceiver 42 or terminal transmitter section 44.

Like FIG. 3, FIG. 5 further shows that the act 5-2, e.g., use of the pool for the sidelink direct discovery, may take various forms. For example, act 5-2A comprises wireless terminal $26_1$ using the resource of the pool for sending a sidelink direct discovery announcement, and act 5-2B comprises wireless terminal $26_1$ monitoring a sidelink direct discovery announcement of another wireless terminal (e.g., of wireless terminal $26_2$) on the resource of the pool.

Figure 6:
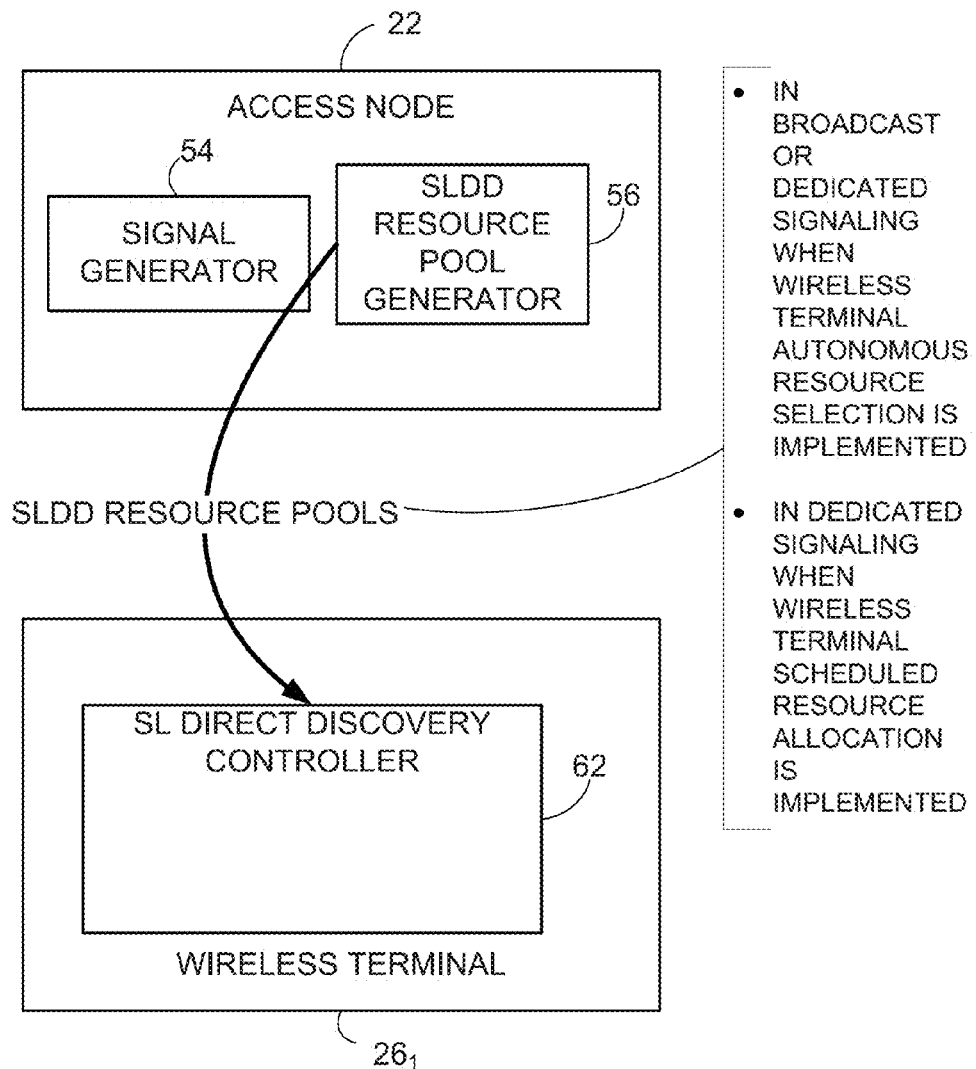
FIG. 6 is a diagrammatic view showing information regarding a radio resource pool(s) allocated to the wireless terminal for sidelink direct discovery as being transmitted in broadcast or dedicated signaling when wireless terminal autonomous resource selection is implemented but transmitted in dedicated signaling when wireless terminal scheduled resource allocation is implemented.

FIG. 6 shows that the information regarding an in-coverage radio resource pool(s) allocated to the wireless terminal for sidelink direct discovery may be generated by the sidelink direct discovery (SLDD) resource pool generator 56 of radio access node 22. Further, the node signal generator 54 of radio access node 22 may include the information regarding a radio resource pool(s) allocated to the wireless terminal for sidelink direct discovery in a signal which is transmitted (e.g., by node transmitter 32) to wireless terminal 26. The signal may be, for example, in a frame or sub-frame as previously described, and may comprise an appropriate channel of such frame or sub-frame. In an example embodiment and mode, the information regarding an in-coverage radio resource pool(s) allocated to the wireless terminal for sidelink direct discovery may be generated as and transmitted in radio resource control (RRC) signaling. In an example implementation as shown in FIG. 6, the radio access node 22 is configured to transmit the information regarding the pool in broadcast or dedicated signaling when wireless terminal autonomous resource selection is implemented, but is configured to transmit the information regarding the pool in dedicated signaling when wireless terminal scheduled resource allocation is implemented. The broadcast signaling and dedicated signaling of FIG. 6 may be radio resource control (RRC) signaling, it being understood with respect to broadcast signaling however that in the RRC_IDLE state there is no RRC connection but the wireless terminal can still receive broadcast signaling.

Figure 7:
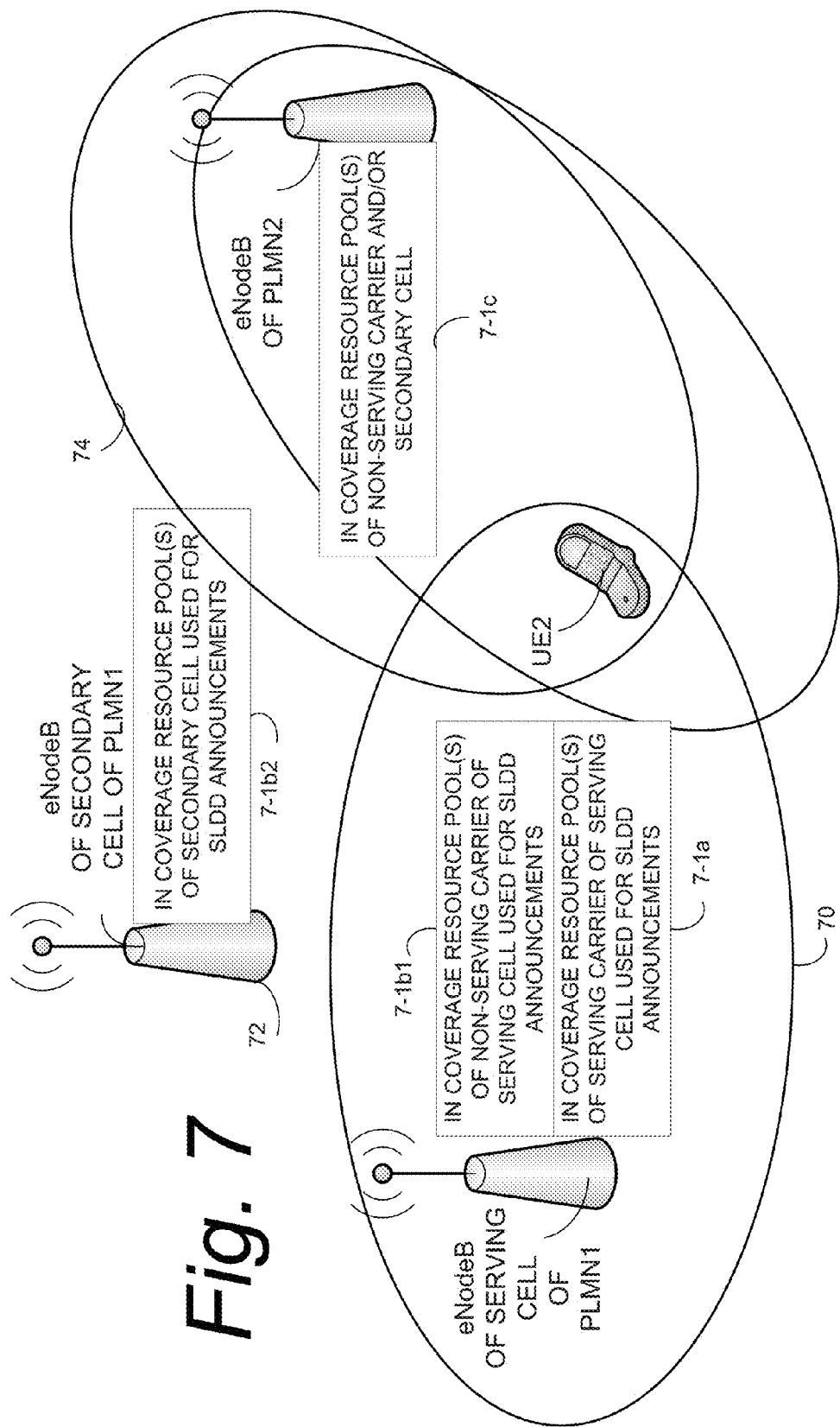
FIG. 7 is a diagrammatic view showing examples of in-coverage radio resource pools that may be included in or comprise an in-coverage radio resource pool.

In an example embodiment and mode illustrated in FIG. 7, the radio resource pool is configured to include an in-coverage radio resource pool allocated for the wireless terminal to use when the wireless terminal is in coverage of the radio access network. FIG. 7 particularly shows examples of in-coverage radio resource pools that may be included in or comprise the in-coverage radio resource pool. It will be remembered that, as used herein, a pool may comprise other pools, for which reason it is said that the in-coverage radio resource pool may comprise plural radio resource pools. For example, the in-coverage radio resource pool may comprise an in-coverage resource pool 7-1a allocated by a serving cell, e.g., allocated by the radio access node 22 which serves wireless terminal $26_1$ in serving cell 70 of FIG. 7. Additionally or alternatively, the in-coverage radio resource pool may comprise an in-coverage resource pool 7-1b1 which is allocated by a non-serving carrier (e.g., a non-serving carrier transmitted from the serving radio access node). Additionally or alternatively, the in-coverage radio resource pool may comprise an in-coverage resource pool 7-1b2 of a secondary cell such as secondary cell 72 of FIG. 7. In FIG. 7, both serving cell 70 and secondary cell 72 may belong to the same public land mobile network (PLMN1). Additionally or alternatively, the in-coverage radio resource pool may comprise an in-coverage resource pool 7-1c of non-serving carrier and/or a secondary cell 74 which belongs belong to a different public land mobile network (PLMN2) than the serving node.

Figure 8:
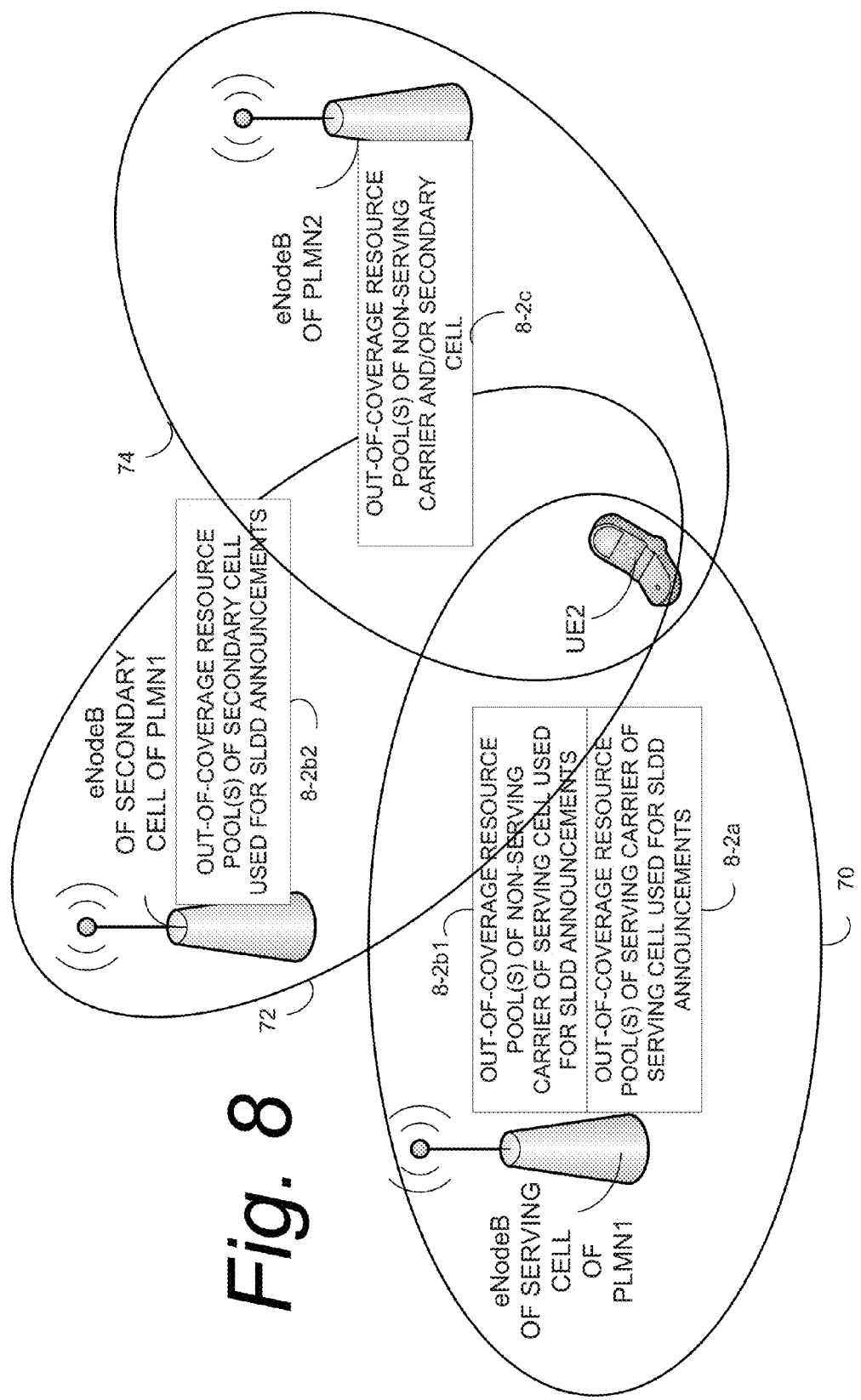
FIG. 8 is a diagrammatic view showing examples of out-of-coverage radio resource pools that may be included in or comprise an out-of-coverage radio resource pool.

Thus, FIG. 7 shows that the in-coverage radio resource pool may comprise one or more of the following: (1a) an in-coverage resource pool 7-1a allocated by a serving cell; (1b) an in-coverage resource pool 7-1b1 or 7-1b2 respectively allocated by a (1b1) non-serving carrier and/or a (1b2) secondary cell 72, wherein the non-serving carrier and/or a secondary cell belong to a same public land mobile network (PLMN) as the node; (1c) an in-coverage resource pool 7-1c1 allocated by a (1c1) non-serving carrier and/or a (1c2) secondary cell, wherein the non-serving carrier and/or a secondary cell 74 belong to a different public land mobile network (PLMN) than the node In an example embodiment and mode illustrated in FIG. 8, the radio resource pool may also be configured to include an out-of-coverage radio resource pool allocated for the wireless terminal to use when the wireless terminal is out-of-coverage of the radio access network. FIG. 8 particularly shows examples of out-of-coverage radio resource pools that may be included in or comprise the out-of-coverage radio resource pool. For example, the out-of-coverage radio resource pool may comprise an out-of-coverage resource pool 8-2a which is allocated by serving cell 70. Additionally or alternatively, the out-of-coverage radio resource pool may comprise an out-of-coverage resource pool 8-2b1 which is allocated by a non-serving carrier. Additionally or alternatively, the out-of-coverage radio resource pool may comprise an out-of-coverage resource pool 8-2b2 which is allocated by secondary cell 72. In FIG. 8, like FIG. 7, the non-serving carrier and/or a secondary cell belong to a same public land mobile network (e.g., PLMN1) as the node of serving cell 70. Additionally or alternatively, the out-of-coverage radio resource pool may comprise an out-of-coverage resource pool 8-2c which is allocated by a non-serving carrier and/or secondary cell 74. In FIG. 8, the non-serving carrier and/or secondary cell 74 belong to a different public land mobile network (e.g., PLMN2) than the node of serving cell 70.

Thus, FIG. 8 shows that the out-of-coverage radio resource pool may comprise one or more of the following: (2a) an out-of-coverage resource pool 8-2a allocated by a serving cell; (2b) an out-of-coverage resource pool 8-2b1 or 8-2b2 respectively allocated by a non-serving carrier and/or secondary cell 72 (wherein the non-serving carrier and/or a secondary cell 72 belong to a same public land mobile network (PLMN1) as the node of the serving cell 70; and (2c) an out-of-coverage resource pool 8-2c allocated by a non-serving carrier and/or a secondary cell 74 which belongs to a different public land mobile network (e.g., PLMN2) than the node of the serving cell 70.

Figure 9:
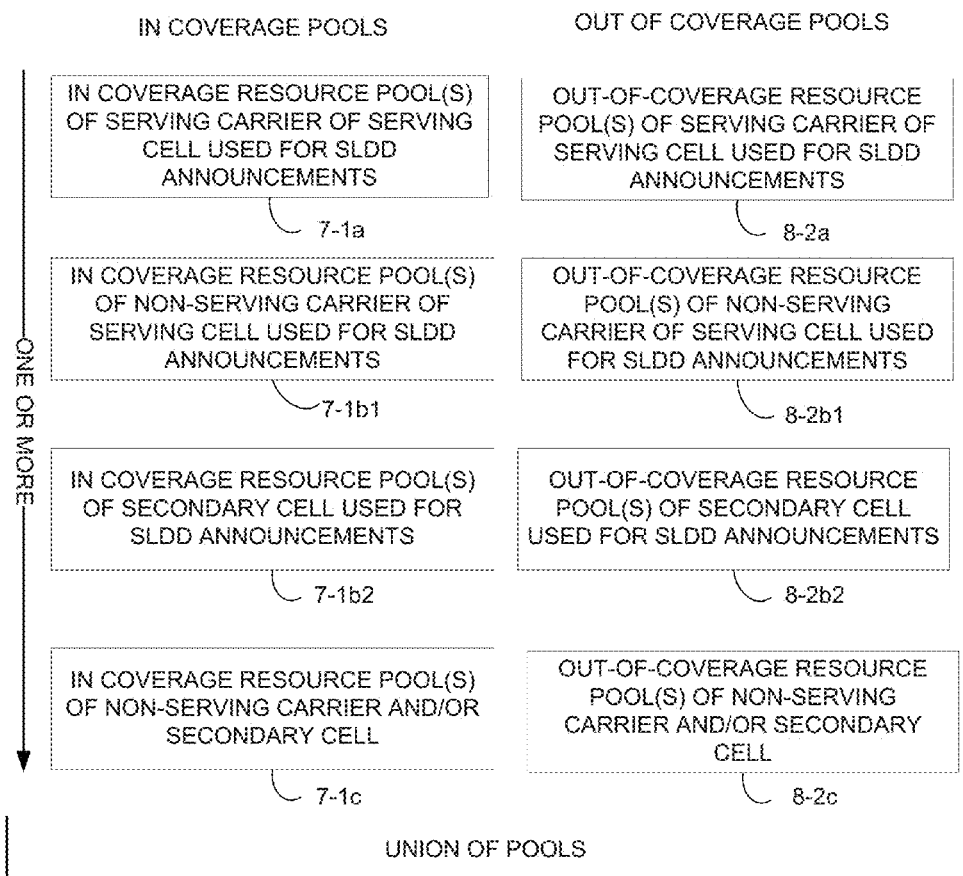
FIG. 9 is a diagrammatic view showing that a radio resource pool, which the wireless terminal is to use for sidelink direct discovery when the wireless terminal is either in a partial coverage discovery scenario or an out-of-coverage discovery scenario, may include a union of one or more in-coverage pools and/or one or more out-of-coverage pools.

FIG. 9 is a diagrammatic view showing that a radio resource pool which is transmitted to wireless terminal $26_1$, regardless of the source of the radio resource pool, may include a union of one or more of the in-coverage pools of FIG. 7 and/or one or more of the out-of-coverage pools of FIG. 8. In other words, the radio resource pool which is generated by sidelink direct discovery (SLDD) resource pool generator 56 may include (1) one or more of pool 7-1a, pool 7-1b1, pool 7-1b2, and pool 7-1c (see FIG. 7), and/or (2) one or more of pool 8-2a, pool 8-2b1, pool 8-2b2, and pool 8-2c (see FIG. 8). The radio resource pool may be generated by a sidelink direct discovery (SLDD) resource pool generator 56 of radio access node 22 and received by wireless terminal $26_1$ when the wireless terminal $26_1$ is in coverage, or may be generated by another entity such as another wireless terminal whose signal with radio resource pool can be received by wireless terminal $26_1$ even when the wireless terminal $26_1$ is out-of-coverage. The preconfigured radio resource pool stored in memory of wireless terminal $26_1$ may also include such union of pools.

In an example embodiment and mode the radio resource pool which is generated for wireless terminal $26_1$ may be included in a signal which received by wireless terminal $26_1$. A first non-limiting example of such a signal is shown as signal 80A in FIG. 10A. The signal 80A is shown as comprising a pool information field 82A which may comprise information regarding the pool generated by sidelink direct discovery (SLDD) resource pool generator 56. Such information of pool information field 82A may comprise an identification or listing of the pool or constituent pools that comprise the pool. By way of example, the pool information field 82A of FIG. 10A shows the pool as comprising pools 7-1a (see FIG. 7) and 8-2a (see FIG. 8), e.g., the in-coverage radio resource pool and out-of-coverage radio resource pool of serving cell serving cell 70 (e.g., radio access node 22). By contrast, the signal 80B of FIG. 10B has a pool information field 82B which includes information for all of the pools of FIG. 9, e.g., for pool 7-1a, pool 7-1b1, pool 7-1b2, pool 7-1c (see FIG. 7), pool 8-2a, pool 8-2b1, pool 8-2b2, pool 8-2c (see FIG. 8).

In accordance with another aspect of the technology disclosed herein, a radio resource pool may comprise plural radio resource pools for use in sidelink direct discovery, and a selection signal or selection indication may be provided or obtained to enable the wireless terminal to make a selection of a selected radio resource pool (e.g., one or more selected radio resource pools) from the plural radio resource pools to use for the sidelink direct discovery. Although the selection signal or selection indication may be used to select pools for sidelink direct discovery use when the wireless terminal is in at least one of a partial coverage discovery scenario and an out-of-coverage discovery scenario, use of the selection signal or selection indication is not limited to these two discovery scenarios.

In the above regard, FIG. 11 illustrates plural radio resource pools 84 as well as an example selection signal or indication 86. In the particular example format of the selection signal or indication 86 of FIG. 11, the selection signal or indication 86 includes corresponding values that indicate which of the constituent pools of plural radio resource pools 84 are eligible for selection as a selected radio resource pool for use by the wireless terminal in sidelink direct discovery. It just so happens that the "1" values of selection signal or indication 86 indicate that pools 7-1a and 8-2a are eligible (e.g., allowed) for selection. The incoming data client 86 thus conversely indicates by value "0" that the other pools are "prohibited". The selection signal 86 of FIG. 11 would thus have a similar result as the signal 80A of FIG. 10A. FIG. 11 thus shows that the plural radio resource pools 84 provided to a wireless terminal may be overly inclusive, and that a selection signal or indication 86 may be used to filter or narrow actual eligibility/permissivity/prohibition of the constituent pools of the group in accordance with any desirable criteria.

It should be understood that, in an example embodiment and mode, the format of selection signal or indication 86 is not limited to a one-to-one correspondence of eligible values to respective radio resource pools. For example, FIG. 12 shows that one or more of the radio resource pools of the plural radio resource pools 84 may have associated therewith a pool type indicator 88. For example, two pool types are shown in FIG. 12, e.g., in-coverage type pools (indicated by "IN" pool type indicator 88) and out-of-coverage type pools (indicated by "OUT" pool type indicator 88). In such example embodiment, the selection signal or indication 86 may simply be an indication of which type of radio resource pool is eligible for selection, e.g., either the in-coverage type pools (indicated by "IN" pool type indicator 88) or the out-of-coverage type pools (indicated by "OUT" pool type indicator 88). Thus, in FIG. 12, the wireless terminal is provided with an in-coverage indication ("IN") so that the in-coverage radio resource pool associated with the in-coverage indication is identified as an in-coverage radio resource pool and an out-of-coverage indication ("OUT") so that the out-of-coverage radio resource pool associated with the out-of-coverage indication is identified as an out-of-coverage radio resource pool Thus, the plural radio resource pool may comprise plural types of radio resource pools, and the selection signal or indication may comprises a pool selection signal which is configured to select between the plural types of radio resource pool for use by the wireless terminal in the sidelink direct discovery. In an example embodiment and mode, the plural types of radio resource pools may comprise in-coverage radio resource pools and out-of-coverage radio resource pools, and the pool selection signal may be used to select between the in-coverage radio resource pools and out-of-coverage radio resource pools for use by the wireless terminal in the sidelink direct discovery.

Figure 13:
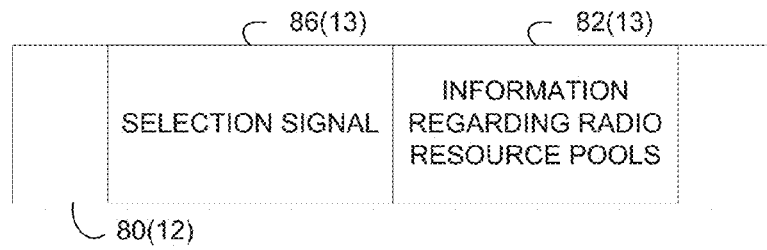
FIG. 13 is a diagrammatic view showing an example embodiment and mode wherein a signal includes a pool information field and a selection signal.

FIG. 13 reflects an example embodiment and mode wherein signal 80(13) includes not only a pool information field 82(13) (such as that shown in FIG. 10A or FIG. 10B), but also a field for selection signal 86(13). The selection signal or indication 86(13) may be of the type shown in FIG. 11, or may (in the example embodiment in which pool type indicators are used) indicate pool type(s) that are eligible for selection. The selection signal or indication 86 may be generated for inclusion in the signal 80.

In an example embodiment in which the wireless terminal 26$_1$ is in coverage, the selection signal or indication 86 may be generated by selection signal generator 58 and included in signal 80 by node signal generator 54. In other embodiments, however, the selection signal or indication 86 may be preconfigured or stored in memory of the wireless terminal 26$_1$ (e.g., memory device 90 or resource pool memory 68), or received from another wireless terminal.

Figure 14:
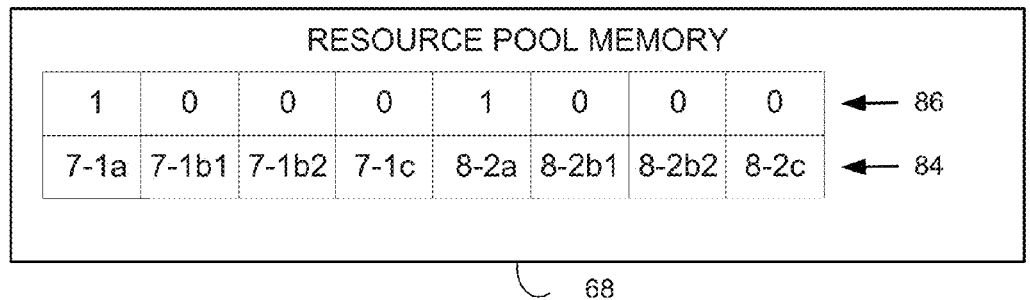
FIG. 14 is a diagrammatic view showing a resource pool memory of a wireless terminal as comprising plural radio resource pools and selection signal or indication.

In some example embodiments and modes the selection signal or indication 86 is stored in a memory, e.g., in resource pool memory 68, of wireless terminal 26. By way of example, FIG. 14 shows resource pool memory 68 of wireless terminal 26 as comprising plural radio resource pools 84 and selection signal or indication 86. As explained herein, one or both of plural radio resource pools 84 and selection signal or indication 86 may be preconfigured in resource pool memory 68, or obtained from radio access node 22 (e.g., reconfigured after initial preconfiguration).

Figure 15:
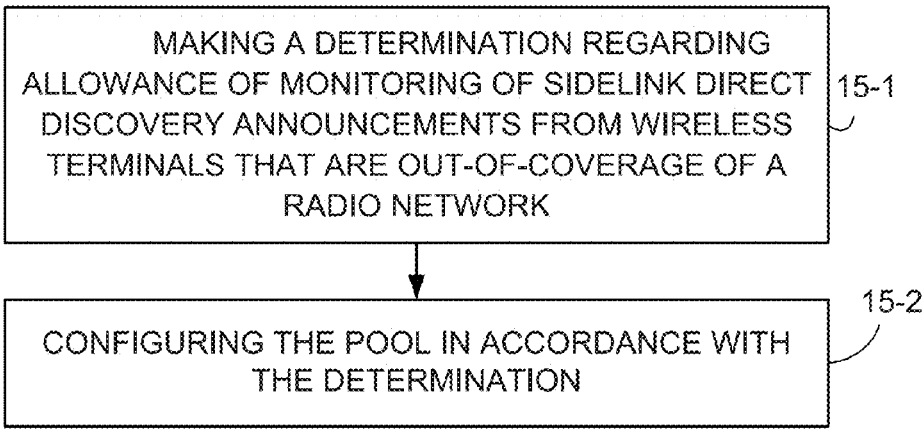
FIG. 15 is a flowchart showing example, representative acts or steps performed by a radio access node regarding desirability or allowance of sidelink direct discovery for wireless terminals that are out-of-coverage and configuration of a radio resource pool accordingly.

The selection signal or indication 86 based on any suitable or desirable criteria. For example, if there is network congestion or a desire to minimize signaling, the selection signal or indication 86 may express more limited eligibility. In some example implementations, for example, the radio access node 22 may make a determination regarding desirability or allowance of sidelink direct discovery for wireless terminals that are out-of-coverage, and may configure the radio resource pool accordingly. Thus in a mode of operating an entity which generates the selection signal or indication 86, shown in FIG. 15, act 15-1 comprises the entity making a determination regarding allowance of monitoring of sidelink direct discovery discovery announcements from wireless terminals that are out-of-coverage, and act 15-2 comprises the entity configuring the radio resource pool in accordance with the determination of act 15-1. If the determination is that sidelink direct discovery announcements from out-of-coverage wireless terminals should be permitted, the radio resource pool is configured accordingly. For example, the radio resource pool may be configured to include one or more of the pool 8-2a, pool 8-2b1, pool 8-2b2, pool 8-2c of FIG. 8 (possibly in addition to one or more of the pool 7-1a, pool 7-1b1, pool 7-1b2, pool 7-1c of FIG. 7). Otherwise, if the determination of act 15-1 is that sidelink direct discovery announcements from out-of-coverage wireless terminals should not be permitted, the radio resource pool is configured to exclude out-of-coverage radio resource pools such as those of FIG. 8.

Figure 16:
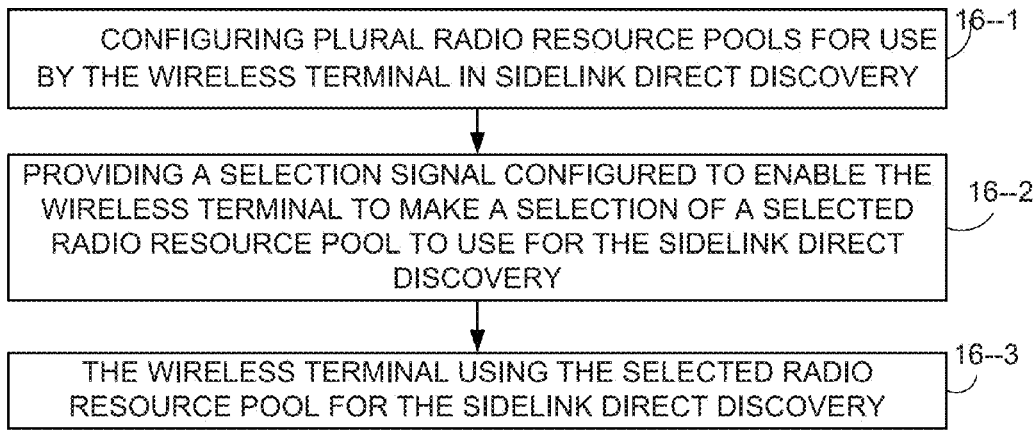
FIG. 16 is a flowchart showing example, representative acts or steps that may be performed by a communications network in example embodiments and modes in which selection signal or indication is utilized.

FIG. 16 shows example acts or steps that may be performed by a communications network in example embodiments and modes in which selection signal or indication 86 is utilized. Act 16-1 comprises configuring plural radio resource pools for use by the wireless terminal in sidelink direct discovery. The plural radio resource pools may be either signaled to the wireless terminal in the manner of signal 80, or pre-configured or reconfigured at the wireless terminal.

Act 16-2 comprises providing a selection signal configured to enable the wireless terminal to make a selection of a selected radio resource pool to use for the sidelink direct discovery. The selection signal, such as selection signal or indication 86, may also be either transmitted to the wireless terminal 26 or pre-configured/reconfigured at wireless terminal 26.

Act 16-3 comprises the wireless terminal using the selected radio resource pool for the sidelink direct discovery. As explained previously with reference to FIG. 3 or FIG. 5, for example, use of the selected radio resource pool may be for sending a sidelink direct discovery announcement or for monitoring a sidelink direct discovery announcement sent by another wireless terminal (e.g., second wireless terminal 26$_2$).

As explained above, the plural radio resource pool may comprise plural types of radio resource pools, and the selection signal may comprises a pool selection signal which is configured to select between the plural types of radio resource pool for use by the wireless terminal in the sidelink direct discovery. In an example embodiment and mode, the plural types of radio resource pools may comprise in-coverage radio resource pools and out-of-coverage radio resource pools, and the pool selection signal may be used to select between the in-coverage radio resource pools and out-of-coverage radio resource pools for use by the wireless terminal in the sidelink direct discovery.

Moreover, the radio resource pool(s) which may be used for a wireless terminal in partial coverage or out-of-coverage may be originated or received from one or more sources (including being preconfigured in the wireless terminal), and the selection signal may originate or be received from the same or different source as the radio resource pool(s).

In certain example embodiments and modes the plural types of radio resource pools may comprise radio resource pools obtained from different sources; and the pool selection signal 86 may select between the differently obtained radio resource pools for use by the wireless terminal in the sidelink direct discovery. Examples of such embodiments and modes include those directed to wireless terminals which are out-of-coverage and which have acquired radio resource pools from different sources. Examples of such different sources include one or more of the following, each described briefly separately below: a memory device of the wireless terminal wherein plural radio resource pools are preconfigured and/or reconfigured (e.g., after initial configuration by the radio access node 22); a broadcast channel of another wireless terminal; and, a sidelink direct discovery signal from another wireless terminal.

Figure 17:
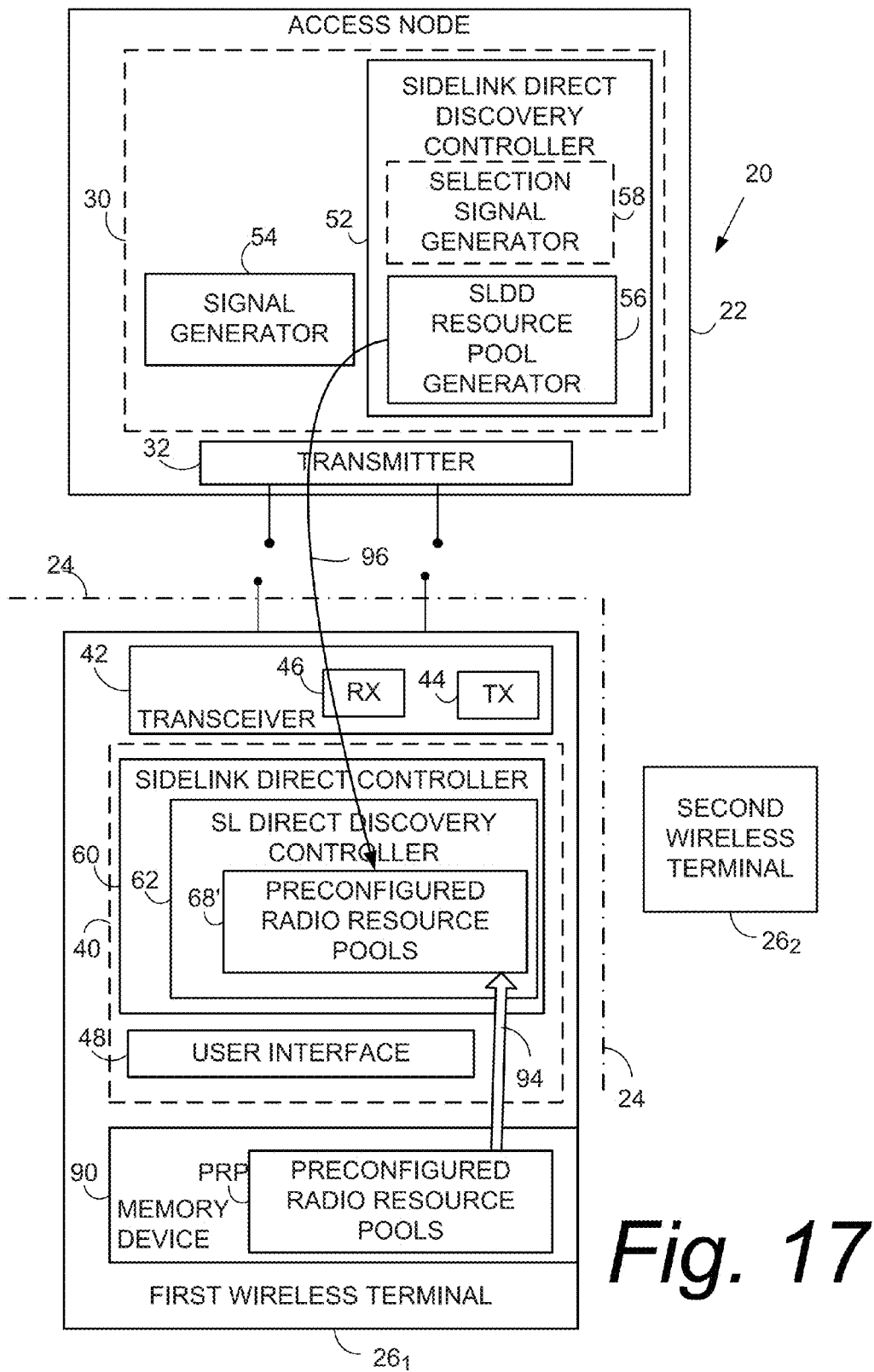
FIG. 17 is a schematic view of an example generic embodiment of a radio communications network in which a source of the radio resource pools comprises a memory device of the wireless terminal.

FIG. 17 illustrates an example embodiment and mode in which a source of the radio resource pools is a memory device of the wireless terminal wherein plural radio resource pools are preconfigured and/or reconfigured (e.g., after initial configuration by the radio access node 22). In particular, FIG. 17 shows wireless terminal memory device 90 in which radio resource pool information may be stored, e.g., preconfigured. In an example implementation, the wireless terminal memory device 90 may be an electronic device such as a card (e.g., SIM card or universal integrated circuit card (UICC)) installed in the wireless terminal, or from some other circuit entity such as Mobile Equipment (ME) which is externally loaded into the wireless terminal. UICC is described in ETSI TR 102 216 where it is defined as a "smart card that conforms to the specifications written and maintained by the ETSI Smart Card Platform project. 3GPP TS 11.11 V8.14.0 (2007-June); 3rd Generation Partnership Project; Technical Specification Group Terminals Specification of the Subscriber Identity Module-Mobile Equipment (SIM-ME) interface (Release 1999) describes the Mobile Equipment (ME).

FIG. 17 shows the wireless terminal memory device 90 as comprising one or more preconfigured radio resource pools 92. As shown by arrow 94, the one or more preconfigured radio resource pools 92 may be loaded into resource pool memory 68 so that it become preconfigured resource pool memory 68'. Moreover, the contents of resource pool memory 68 may be updated, replaced, or revised by a pool reconfiguration signal 96 which may be generated by sidelink direct discovery (SLDD) resource pool generator 56 in the manner previously described and sent to wireless terminal 26 when the wireless terminal 26 is in coverage of the radio access network to which radio access node 22 belongs.

Figure 18:
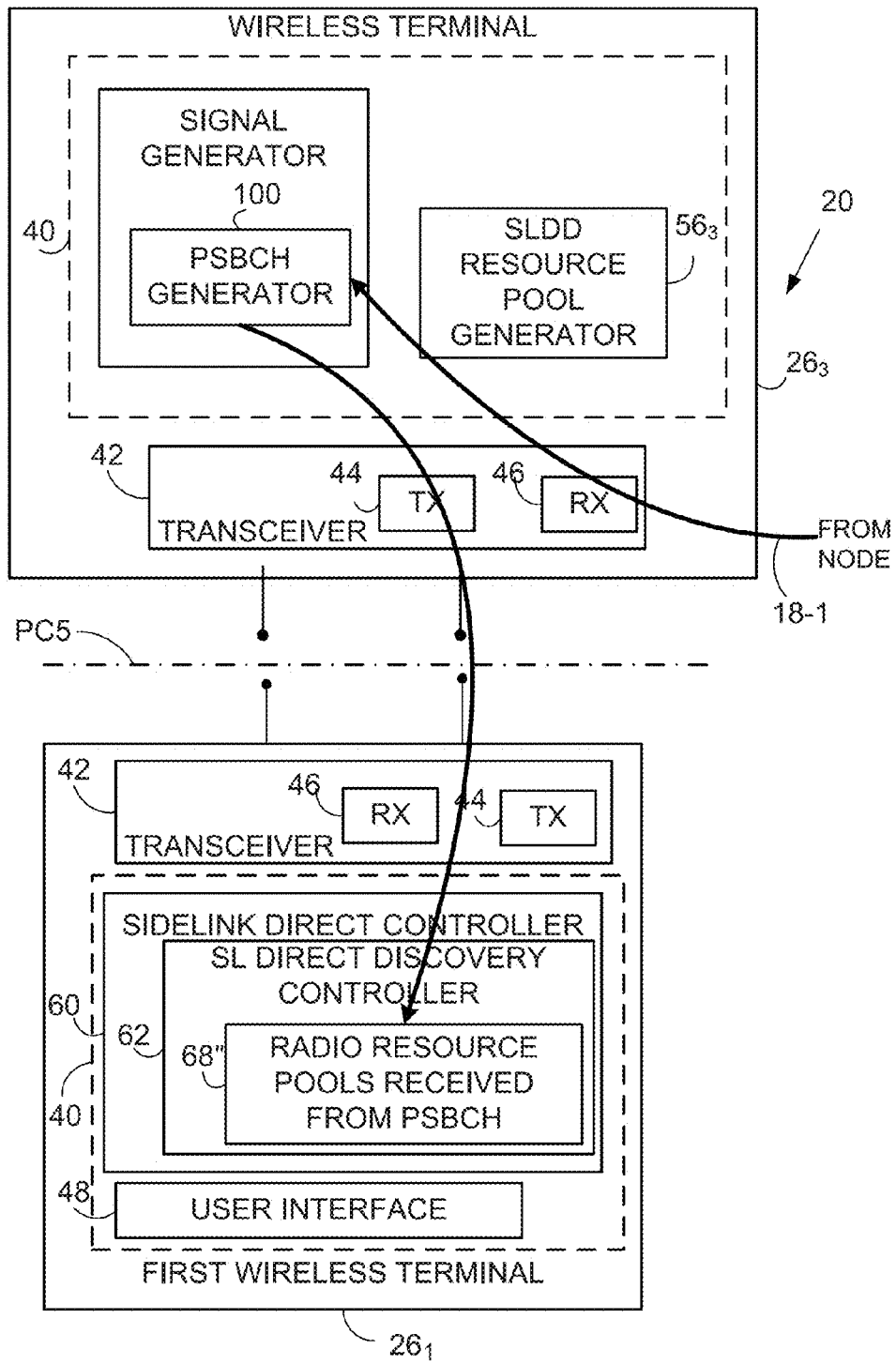
FIG. 18 is a schematic view of an example generic embodiment of a radio communications network in which a source of the radio resource pools comprises a broadcast channel of a wireless terminal.

FIG. 18 illustrates an example embodiment and mode in which a source of the radio resource pools is a broadcast channel received from another wireless terminal, e.g., wireless terminal 26$_3$. FIG. 18 shows second wireless terminal 26$_2$ as comprising some of the same functionalities as wireless terminal 26$_1$, including terminal transmitter section 44 and terminal processor 40 (which in turn comprises terminal sidelink direct controller 60 and a Physical Sidelink Broadcast Channel (PSBCH) generator 100). The terminal sidelink direct controller 60 of third wireless terminal 26$_3$ comprises sidelink direct discovery (SLDD) resource pool generator 56$_2$.

In the FIG. 18 embodiment, the Physical Sidelink Broadcast Channel (PSBCH) is prepared by wireless terminal 26$_3$ and sent through the PC5 interface to wireless terminal 26$_1$.

In operation, as indicated by arrow 18-1 the in-coverage wireless terminal 26$_3$ receives legacy BCH and/or dedicated signaling information from radio access node 22, which may include resource pool information. The wireless terminal 26$_3$ then prepares PSBCH including out of coverage resource pool information to transmit with SLSS for SL communications to wireless terminal 26$_1$. In this regard the wireless terminal 26$_3$ may deduce from signaling received from the node what out-of-coverage radio resource pool information is to be included in the Physical Sidelink Broadcast Channel (PSBCH). That is, the wireless terminal 26$_3$ may either simply include any out-of-coverage radio resource pool information it receives from the node, or the sidelink direct discovery (SLDD) resource pool generator 56$_2$ of wireless terminal 26$_3$ may modify such received out-of-coverage radio resource pool information, or even generate on its own accord appropriate out-of-coverage radio resource pool information, for inclusion in the Physical Sidelink Broadcast Channel (PSBCH).

The wireless terminal 26$_3$ may then forward such out of coverage resource pool information to out-of-coverage wireless terminals, such as wireless terminal 26$_1$. The information obtained through the Physical Sidelink Broadcast Channel (PSBCH) including the out-of-coverage radio resource pool information can then further be transmitted in out of coverage scenario from wireless terminal 26$_1$ through (1) PSBCH associated with SLSS for SL communications (current spec-defined) (2) PSBCH associated with SLSS for SLDD if so permitted.

Figure 19:
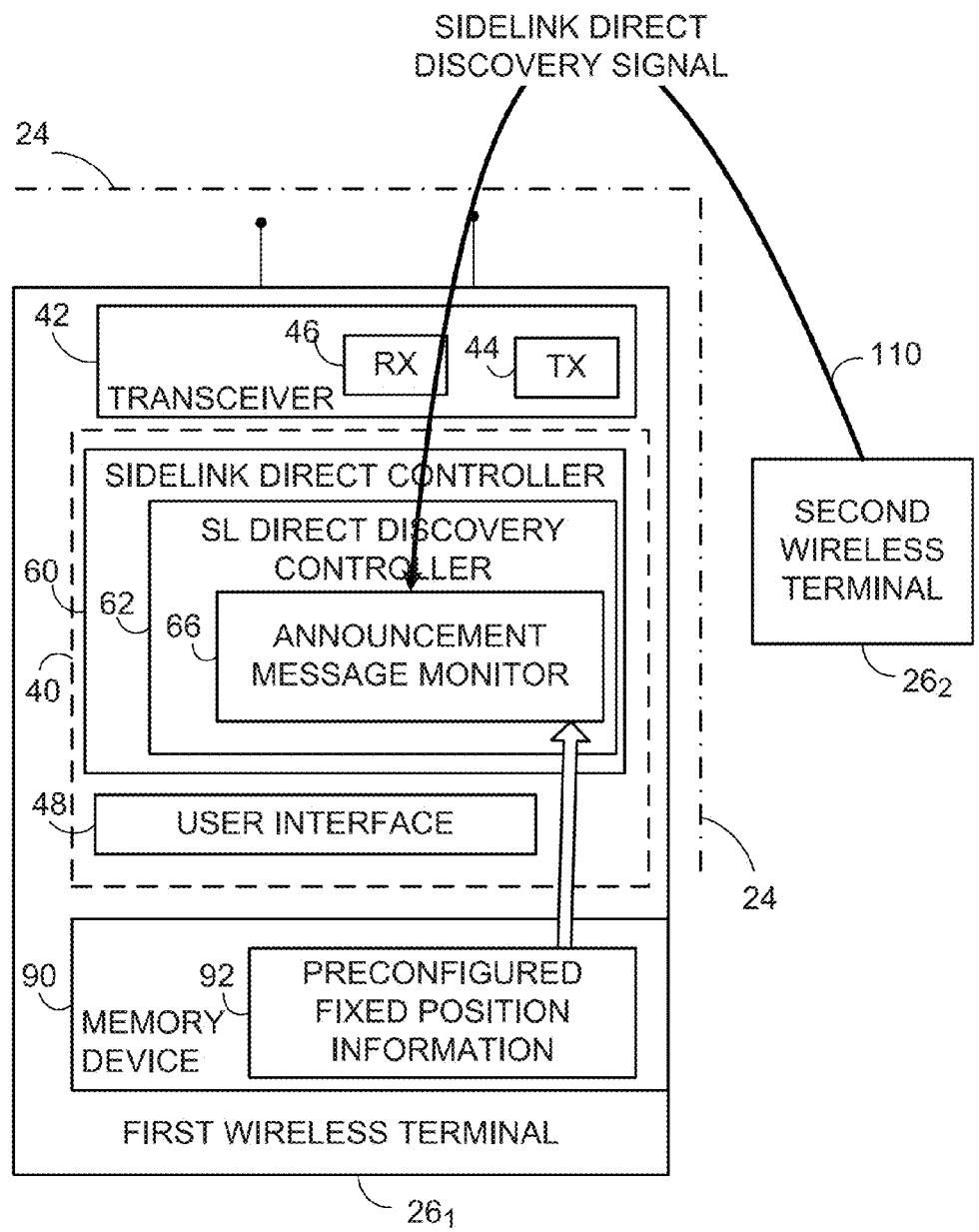
FIG. 19 is a schematic view of an example generic embodiment of a radio communications network in which a source of the radio resource pools comprises a sidelink direct discovery signal from another wireless terminal.

FIG. 19 illustrates an example embodiment and mode in which a source of the radio resource pools is a sidelink direct discovery signal from another wireless terminal. FIG. 19 shows that terminal sidelink direct discovery controller 62 comprises announcement message monitor 66 which detects sidelink direct discovery signal 110 from third wireless terminal 263.

The example embodiments and modes of FIG. 17, FIG. 18, and FIG. 19 are further understood with reference to U.S. Provisional application 62/145,492 filed on Apr. 9, 2015 and entitled "METHOD AND APPARATUS FOR SIDELINK DIRECT DISCOVERY RESOURCE POOL ALLOCATION FOR OUT-OF-COVERAGE WIRELESS TERMINAL" which is incorporated herein by reference in its entirety.

Figure 20:
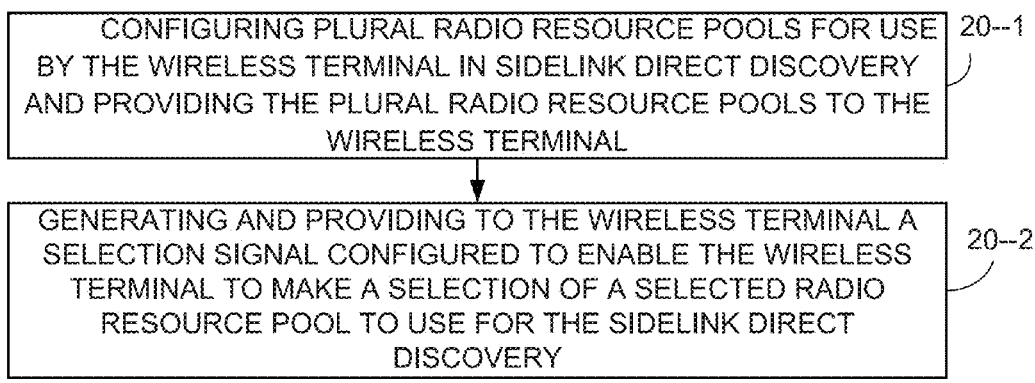
FIG. 20 is a schematic view of an example generic embodiment of a radio communications network in which a source of the radio resource pools comprises a broadcast channel.

FIG. 20 shows example basic, representative acts or steps that may be performed by an entity that prepares both plural radio resource pools for use in sidelink direct discovery, and a selection signal or selection indication to enable the wireless terminal to make a selection of a selected radio resource pool (e.g., one or more selected radio resource pools) from the plural radio resource pools to use for the sidelink direct discovery. Act 20-1 comprises the entity configuring plural radio resource pools for use by the wireless terminal 26 in sidelink direct discovery and providing the plural radio resource pools to the wireless terminal. Act 20-2 comprises the entity generating and providing to the wireless terminal 26 a selection signal configured to enable the wireless terminal to make a selection of a selected radio resource pool to use for the sidelink direct discovery.

In conjunction with the method of FIG. 20, the entity (which may be a node or other wireless terminal, for example) is configured to configure plural radio resource pools for use by the wireless terminal in sidelink direct discovery and to provide the plural radio resource pools to the wireless terminal, and to generate a selection signal configured to enable the wireless terminal to make a selection of a selected radio resource pool to use for the sidelink direct discovery. If the entity is an access or network node, the plural radio resource pools may be configured by sidelink direct discovery (SLDD) resource pool generator 56; and the selection signal may be generated by selection signal generator 58. The node transmitter 32 configured to transmit information related to the plural radio resource pools and the selection signal to the wireless terminal over the radio interface.

Figure 21:
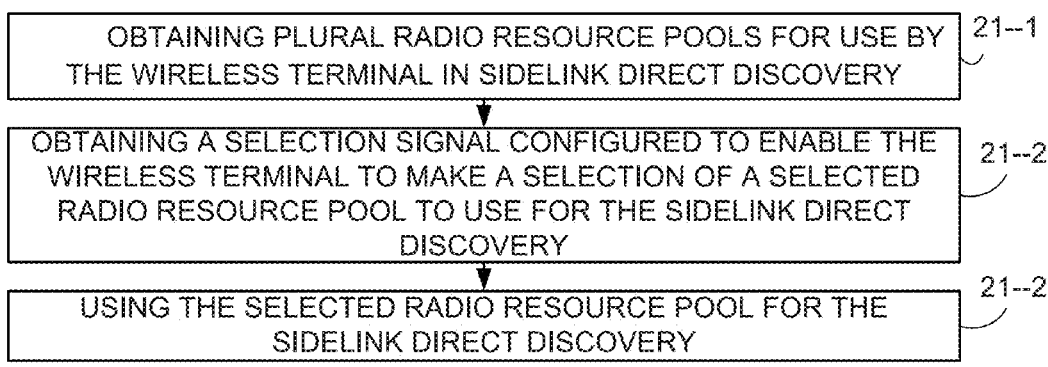
FIG. 21 is a schematic view of an example generic embodiment of a radio communications network in which a source of the radio resource pools comprises a sidelink direct discovery signal from another wireless terminal.

FIG. 21 shows example basic, representative acts or steps that may be performed by wireless terminal 26 in the aspect of the technology wherein a radio resource pool may comprise plural radio resource pools for use in sidelink direct discovery, and a selection signal or selection indication may be provided or obtained to enable the wireless terminal to make a selection of a selected radio resource pool (e.g., one or more selected radio resource pools) from the plural radio resource pools to use for the sidelink direct discovery. Act 21-1 comprises the wireless terminal 26 obtaining plural radio resource pools for use by the wireless terminal in sidelink direct discovery. Act 21-2 comprises the wireless terminal 26 obtaining a selection signal configured to enable the wireless terminal to make a selection of a selected radio resource pool to use for the sidelink direct discovery. Act 21-3 comprises the wireless terminal using the selected radio resource pool for the sidelink direct discovery (e.g., either sending a sidelink direct discovery announcement message or monitoring a sidelink direct discovery announcement message sent from another wireless terminal).

In conjunction with the method of FIG. 21, the resource pool memory 68 is configured to store plural radio resource pools for use by the wireless terminal in sidelink direct discovery. The terminal processor 40, e.g., terminal sidelink direct discovery controller 62, is configured to use the selection signal to select the selected radio resource pool and to use the selected radio resource pool for the sidelink direct discovery.

As described herein an encompassed hereby as non-limiting aspect of the technology disclosed herein, the in-coverage (IC) UEs discovery resource pool designs regarding discovery relationship with out-of-coverage UEs cover partial coverage scenario; while out-of-coverage (OOC) UEs resource pool designs cover both partial and out of coverage scenarios.

In order to perform sidelink direct discovery even when some UEs are IC and some UEs are out-of-coverage:
  IC UEs capable of SL direct discovery are configured by higher layers (e.g., the ProSe protocol) to monitor SL direct discovery announcements; there may or may not be specific configuration from higher layer to monitor discovery announcements from out of coverage UEs; if there may or may not be specific configuration from higher layer to prohibit monitoring discovery announcements from out of coverage UEs; no matter what types of configurations they are,
    If the higher layer doesn't prohibit monitoring discovery announcements from out of coverage UEs, then the resource pool used for IC UE SL direct discovery monitoring is configured by the eNB via RRC, in broadcast signaling, which should be the union of the resource pools used for transmission of SL direct discovery announcements in coverage, covering all possible frequencies for announcements transmission for the following alternatives or any type of their combinations,
      Alt 1.1. the serving cell;
      Alt 1.2. non-serving carrier (intra-frequency or inter-frequency) and/or secondary cell belonging to the same PLMN;
      Alt 1.3. non-serving carrier (intra-frequency or inter-frequency) and/or secondary cell belonging to different PLMN;
      and transmission of SL direct discovery announcements for out of coverage. Furthermore, if out of coverage transmission is configured/pre-configured per eNB/cell, covering the following alternatives or any type of their combinations
      Alt 2.1. out of coverage transmission regarding the serving cell;
      Alt 2.2. out of coverage transmission regarding non-serving carrier (intra-frequency or inter-frequency) and/or secondary cell belonging to the same PLMN;
      Alt 2.3. out of coverage transmission regarding non-serving carrier (intra-frequency or inter-frequency) and/or secondary cell belonging to different PLMN;
    If the higher layer prohibits monitoring discovery announcements from out of coverage UEs, then the resource pools used for IC UE SL direct discovery monitoring is configured by the eNB via RRC, in broadcast signaling, which don't have to cover out of coverage transmission.
  The resource pool used for IC UE SL direct discovery announcements transmission is configured by the eNB via RRC, in dedicated or broadcast signalling, if UE autonomous resource selection is used; or configured by the eNB via RRC, in dedicated signalling if scheduled resource allocation is used. According to above design, depending on whether a UE is authorised by the NW to be able to announce discovery message in any combinations of Alt 1.1 to Alt 1.3, the transmission resource pool or eNB scheduled resources should be within the above configured monitoring/reception pool.

According to U.S. Provisional application 62/145,492 filed on Apr. 9, 2015 and entitled "METHOD AND APPARATUS FOR SIDELINK DIRECT DISCOVERY RESOURCE POOL ALLOCATION FOR OUT-OF-COVERAGE WIRELESS TERMINAL", the out-of-coverage (OOC) resource pool allocation can be indicated by (1) pre-configuration in the UICC or ME; (2) PSBCH associated with SL direct discovery SLSS; (3) SL direct discovery itself. No matter in which allocation way,
  OOC capable of SL direct discovery are configured by higher layers to monitor SL direct discovery announcements; there may or may not be specific configuration from higher layer to monitor discovery announcements from in coverage UEs; if there may or may not be specific configuration from higher layer to prohibit monitoring discovery announcements from in coverage UEs; no matter what types of configurations they are,
    If the higher layer doesn't prohibit monitoring discovery announcements from in coverage UEs, then the resource pool used for OOC UE SL direct discovery monitoring is configured/pre-configured with the methods specified in SLA3513P, which is the same as the union motioned above for IC UE SL direct discovery monitoring/reception pools, that is the union of the resource pools used for transmission of SL direct discovery announcements in coverage and out of coverage.
    If the higher layer prohibits monitoring discovery announcements from in coverage UEs, then the resource pool used for OOC UE SL direct discovery monitoring is configured/pre-configured with the methods specified in SLA3513P, which is, based on above design, depending on whether a UE is authorised by the network (NW) to be able to announce discovery message in any combinations of Alt 1.1 to Alt 1.3, the OOC monitoring/reception pools should accordingly cover any associated types of combinations of Alt 2.1 to Alt 2.3.

The resource pool used for OOC UE SL direct discovery announcements transmission is configured/pre-configured with the methods specified in SLA3513P. The OOC transmission pool can be the same as OOC monitoring pool, or the subset of OOC monitoring pool.

Figure 22:
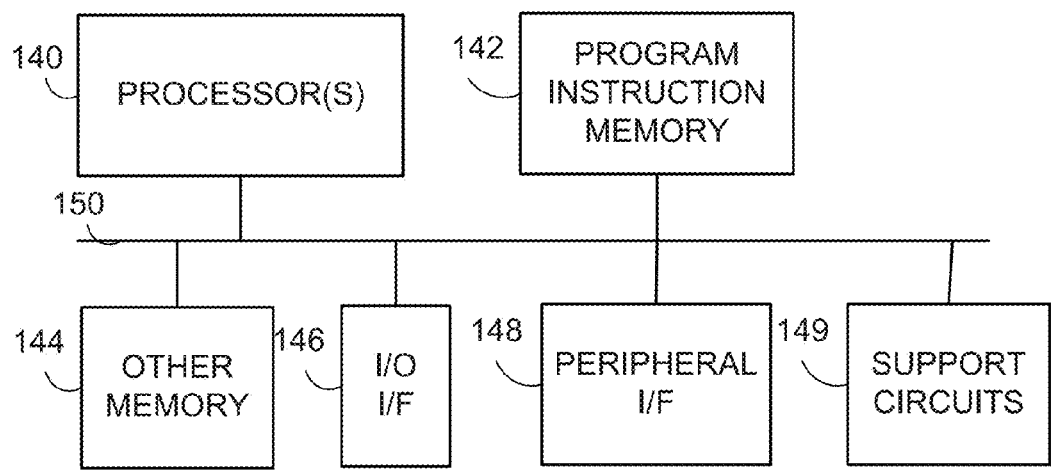
FIG. 22 is a diagrammatic view showing example electronic machinery which may comprise node electronic machinery or terminal electronic machinery.

Certain units and functionalities of node 22 and wireless terminal 26 framed by broken line are, in an example embodiment, implemented by electronic machinery. FIG. 22 shows an example of such electronic machinery, whether node electronic machinery or terminal electronic machinery, as comprising one or more processors 140, program instruction memory 142; other memory 144 (e.g., RAM, cache, etc.); input/output interfaces 146; peripheral interfaces 148; support circuits 149; and busses 150 for communication between the aforementioned units.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

"Frequency" is one kind of "resources". Normally in LTE "resources" mean resource blocks (RBs) in both time and frequency domains. While resource pools mean some RBs with specifically defined ranges (time and/or frequency) for some particular usage, e.g., transmission resource pool, which may include, e.g., resource pool 1 which is specially for mode 1 transmission in the cell, resource pool 2 which is specially for mode 2 transmission in the cell, resource pool 3 which is specially for mode 2 transmission in the intra-frequency adjacent cell. As used herein, "monitoring resource pools with indicated frequency from higher layer" or similar language means the resource pools are designed especially for one cell or some intra-frequency cells. If there is no "indicated frequency from higher layer", the wireless terminal may have to monitor all resource pools in its list, or may monitor some of resource pools in its list according to some priority rules due to implementation issue, such resource pools may or may not cover the "indicated frequency".

The UICC smart card may comprise a CPU, ROM, RAM, EEPROM and I/O circuits." Some information stored in the SIM card may not changeable, like in ROM; but resource pool information may be updatable, like in RAM. When the wireless terminal firstly registers with some cell/PLMN, the pre-configured resource pool information should be able to be updated so as to correspond to the current PLMN.

As described herein, a wireless terminal receives a selection signal (also known as prohibiting or admission information) via three ways, e.g., preconfigured in ME or UICC (preconfigured means when the UE registers with this PLMN, its UICC/ME is refreshed and stored with the configuration information that when the UE is OOC). There are also three ways of allocating radio resource pools, which yields 3×3=nine combinations.

A radio access node 22 may receive in coverage radio resource pools and out-of-coverage resource pools for a non-serving carrier and/or secondary cell for the same PLMN, or in coverage radio resource pools and out-ofcoverage resource pools for a non-serving carrier and/or secondary cell for another PLMN. The nodes may have a strategy for sharing such information over interfaces between nodes, or the wireless terminal may report such information (received from other nodes) to a particular node.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

The technology disclosed herein thus encompasses but is not limited to the following example embodiments:

Example Embodiment 1

A radio access node of a radio access network, the access node comprising: a processor configured and arranged to configure, for a wireless terminal that is served by the node, a radio resource pool including an out-of-coverage radio resource for the wireless terminal to use for sidelink direct discovery when the wireless terminal is either in a partial coverage discovery scenario or an out-of-coverage discovery scenario; a transmitter configured to transmit information regarding the pool over a radio interface to the wireless terminal when the wireless terminal is in coverage of the radio access network.

Example Embodiment 2

The node of example embodiment 1, wherein when the transmitter is configured to transmit the information regarding the pool in Radio Resource Control (RRC) signaling.

Example Embodiment 3

The node of example embodiment 1, wherein when the transmitter is configured to transmit the information regarding the pool in broadcast or dedicated signaling when wireless terminal autonomous resource selection is implemented.

Example Embodiment 4

The node of example embodiment 1, wherein when the transmitter is configured to transmit the information regarding the pool in dedicated signaling when wireless terminal scheduled resource allocation is implemented.

Example Embodiment 5

The node of example embodiment 1, wherein the processor is further configured to configure the pool to include an in-coverage radio resource pool allocated for the wireless terminal to use when the wireless terminal is in coverage of the radio access network.

Example Embodiment 6

The node of example embodiment 5, wherein the processor is configured to include in the in-coverage radio resource pool one or more of the following: (1a) an in-coverage resource pool allocated by a serving cell; (1b) an in-coverage resource pool allocated by a (1b1) non-serving carrier and/or a (1b2) secondary cell, wherein the non-serving carrier and/or a secondary cell belong to a same public land mobile network (PLMN) as the node; (1c) an in-coverage resource pool allocated by a (1c1) non-serving carrier and/or a (1c2) secondary cell, wherein the non-serving carrier and/or a secondary cell belong to a different public land mobile network (PLMN) than the node.

Example Embodiment 7

The node of example embodiment 1, wherein when the processor is further configured and arranged to configure the pool to include an out-of-coverage radio resource pool for use by the wireless terminal when the wireless terminal is either in the partial coverage discovery scenario or the out-of-coverage discovery scenario.

Example Embodiment 8

The node of example embodiment 7, wherein when the processor is further configured and arranged to make a determination regarding allowance of monitoring of sidelink direct discovery announcements from wireless terminals that are out-of-coverage of the radio access network; in accordance with the determination, to configure the pool to include the out-of-coverage radio resource pool.

Example Embodiment 9

The node of example embodiment 8, wherein when the processor is configured to make the allowance determination based on reception of an allowance indication.

Example Embodiment 10

The node of example embodiment 9, wherein the allowance indication is indicative of a network condition.

Example Embodiment 11

The node of example embodiment 7, wherein the processor is configured to include in the out-of-coverage radio resource pool one or more of the following: (2a) an out-of-coverage resource pool allocated by a serving cell; (2b) an out-of-coverage resource pool allocated by a (2b1) non-serving carrier and/or a (2b2) secondary cell, wherein the non-serving carrier and/or a secondary cell belong to a same public land mobile network (PLMN) as the node; (2c) an out-of-coverage resource pool allocated by a (2c1) non-serving carrier and/or a (2c2) secondary cell, wherein the non-serving carrier and/or a secondary cell belong to a different public land mobile network (PLMN) than the node.

Example Embodiment 12

The node of example embodiment 1, wherein the processor is further configured to configure the pool to include an in-coverage radio resource pool allocated for the wireless terminal to use when the wireless terminal is in coverage of the radio access network and an out-of-coverage radio resource pool for use by the wireless terminal when the wireless terminal is either in the partial coverage discovery scenario or the out-of-coverage discovery scenario.

Example Embodiment 13

The node of example embodiment 12, wherein the processor is further configured to generate a selection signal configured to inform the wireless terminal regarding eligibility of plural constituent pools of the pool for use as a selected pool by the wireless terminal for the sidelink direct discovery.

Example Embodiment 14

The node of example embodiment 12, wherein the processor is further configured to generate a selection signal configured to inform the wireless terminal regarding eligibility of at least one of the in-coverage radio resource pool and the out-of-coverage radio resource pool for use by the wireless terminal.

Example Embodiment 15

The node of example embodiment 13, wherein the processor is further configured to provide to the wireless terminal an in-coverage indication so that the in-coverage radio resource pool associated with the in-coverage indication is identified as an in-coverage radio resource pool and an out-of-coverage indication so that the out-of-coverage radio resource pool associated with the out-of-coverage indication is identified as an out-of-coverage radio resource pool.

Example Embodiment 16

A method in a radio access node comprising: configuring, for a wireless terminal, a radio resource pool including an out-of-coverage radio resource for use in sidelink direct discovery when the wireless terminal is either in a partial coverage discovery scenario or an out-of-coverage discovery scenario; transmitting information regarding the pool over a radio interface to the wireless terminals when the wireless terminal is in coverage of the radio access network.

Example Embodiment 17

The method of example embodiment 16, further comprising transmitting the information regarding the pool in Radio Resource Control (RRC) signaling.

Example Embodiment 18

The method of example embodiment 16, further comprising transmitting the information regarding the pool in broadcast or dedicated signaling when wireless terminal autonomous resource selection is implemented.

Example Embodiment 19

The method of example embodiment 16, further comprising transmitting the information regarding the pool in dedicated signaling when wireless terminal scheduled resource allocation is implemented.

Example Embodiment 20

The method of example embodiment 16, further comprising configuring the pool to include an in-coverage radio resource pool allocated for sidelink direct discovery use by the wireless terminal.

Example Embodiment 21

The method of example embodiment 20, further comprising including in the in-coverage radio resource pool one or more of the following: (1a) an in-coverage resource pool allocated by a serving cell; (1b) an in-coverage resource pool allocated by a (1b1) non-serving carrier and/or a (1b2) secondary cell, wherein the non-serving carrier and/or a secondary cell belong to a same public land mobile network (PLMN) as the node; (1c) an in-coverage resource pool allocated by a (1c1) non-serving carrier and/or a (1c2) secondary cell, wherein the non-serving carrier and/or a secondary cell belong to a different public land mobile network (PLMN) than the node.

Example Embodiment 22

The method of example embodiment 16, further comprising configuring the pool to include an out-of-coverage radio resource pool allocated for sidelink direct discovery use when the wireless terminal is either in the partial coverage discovery scenario or the out-of-coverage discovery scenario.

Example Embodiment 23

The method of example embodiment 22, further comprising: making a determination regarding allowance of monitoring of sidelink direct discovery announcements from wireless terminals that are out-of-coverage of a radio network; in accordance with the determination, configuring the pool to include the out-of-coverage radio resource pool.

Example Embodiment 24

The method of example embodiment 23, further comprising making the allowance determination based on reception of an allowance indication from a higher layer.

Example Embodiment 25

The method of example embodiment 24, wherein the allowance indication is indicative of a network condition.

Example Embodiment 26

The method of example embodiment 22, further comprising including in the out-of-coverage radio resource pool one or more of the following: (2a) an out-of-coverage resource pool allocated by a serving cell; (2b) an out-of-coverage resource pool allocated by a (2b1) non-serving carrier and/or a (2b2) secondary cell, wherein the non-serving carrier and/or a secondary cell belong to a same public land mobile network (PLMN) as the node; (2c) an out-of-coverage resource pool allocated by a (2c1) non-serving carrier and/or a (2c2) secondary cell, wherein the non-serving carrier and/or a secondary cell belong to a different public land mobile network (PLMN) than the node.

Example Embodiment 27

The method of example embodiment 16, further comprising configuring the pool to include an in-coverage radio resource pool allocated for the wireless terminal to use when the wireless terminal is in coverage of the radio access network and an out-of-coverage radio resource pool for use by the wireless terminal when the wireless terminal is either in the partial coverage discovery scenario or the out-of-coverage discovery scenario.

Example Embodiment 28

The method of example embodiment 27, further comprising generating a selection signal configured to inform the wireless terminal which of plural constituent pools of the pool are not eligible for use by the wireless terminal.

Example Embodiment 29

The method of example embodiment 27, further comprising generating a selection signal configured to inform the wireless terminal regarding eligibility of at least one of the in-coverage radio resource pool and the out-of-coverage radio resource pool for use by the wireless terminal.

Example Embodiment 30

The method of example embodiment 28, further comprising providing to the wireless terminal an in-coverage indication so that the in-coverage radio resource pool associated with the in-coverage indication is identified as an in-coverage radio resource pool and an out-of-coverage indication so that the out-of-coverage radio resource pool associated with the out-of-coverage indication is identified as an out-of-coverage radio resource pool.

Example Embodiment 31

A method in a communications network which comprises an access node of a radio access network and a wireless terminal, the method comprising: the access node configuring a radio resource pool for use by the wireless terminal in sidelink direct discovery when the wireless terminal is either in a partial coverage discovery scenario or an out-of-coverage discovery scenario; transmitting information regarding the pool over a radio interface to wireless terminals served by the node; the wireless terminal receiving the information regarding the pool when the wireless terminal is in coverage of the radio access network; the wireless terminal when either in partial coverage of the radio access network or out-of-coverage of the radio access network using a resource of the pool for the sidelink direct discovery.

Example Embodiment 32

The method of example embodiment 31, further comprising the wireless terminal using the resource of the pool for sending a sidelink direct discovery announcement.

Example Embodiment 33

The method of example embodiment 31, further comprising the wireless terminal using the resource of the pool for monitoring a sidelink direct discovery announcement of another wireless terminal.

Example Embodiment 34

The method of example embodiment 31, further comprising transmitting the information regarding the pool in Radio Resource Control (RRC) signaling.

Example Embodiment 35

The method of example embodiment 31, further comprising transmitting the information regarding the pool in broadcast or dedicated signaling when wireless terminal autonomous resource selection is implemented.

Example Embodiment 36

The method of example embodiment 31, further comprising transmitting the information regarding the pool in dedicated signaling when wireless terminal scheduled resource allocation is implemented.

Example Embodiment 37

The method of example embodiment 16, further comprising configuring the pool to include an in-coverage radio resource pool allocated for sidelink direct discovery use by a wireless terminal that is in coverage of the radio network.

Example Embodiment 38

The method of example embodiment 37, further comprising including in the in-coverage radio resource pool one or more of the following: (1a) an in-coverage resource pool allocated by a serving cell; (1b) an in-coverage resource pool allocated by a (1b1) non-serving carrier and/or a (1b2) secondary cell, wherein the non-serving carrier and/or a secondary cell belong to a same public land mobile network (PLMN) as the node; (1c) an in-coverage resource pool allocated by a (1c1) non-serving carrier and/or a (1c2) secondary cell, wherein the non-serving carrier and/or a secondary cell belong to a different public land mobile network (PLMN) than the node.

Example Embodiment 39

The method of example embodiment 31, further comprising configuring the pool to include an out-of-coverage radio resource pool allocated for sidelink direct discovery use when the wireless terminal is either in the partial coverage discovery scenario or the out-of-coverage discovery scenario.

Example Embodiment 40

The method of example embodiment 39, further comprising: making a determination regarding allowance of monitoring of sidelink direct discovery announcements from wireless terminals that are out-of-coverage of a radio network; in accordance with the determination, configuring the pool to include the out-of-coverage radio resource pool.

Example Embodiment 41

The method of example embodiment 40, further comprising making the allowance determination based on reception of an allowance indication from a higher layer.

Example Embodiment 42

The method of example embodiment 41, wherein the allowance indication is indicative of a network condition.

Example Embodiment 43

The method of example embodiment 39, further comprising including in the out-of-coverage radio resource pool one or more of the following: (2a) an out-of-coverage resource pool allocated by a serving cell; (2b) an out-of-coverage resource pool allocated by a (2b1) non-serving carrier and/or a (2b2) secondary cell, wherein the non-serving carrier and/or a secondary cell belong to a same public land mobile network (PLMN) as the node; (2c) an out-of-coverage resource pool allocated by a (2c1) non-serving carrier and/or a (2c2) secondary cell, wherein the non-serving carrier and/or a secondary cell belong to a different public land mobile network (PLMN) than the node.

Example Embodiment 44

The method of example embodiment 31, further comprising configuring the pool to include an in-coverage radio resource pool allocated for the wireless terminal to use when the wireless terminal is in coverage of the radio access network and an out-of-coverage radio resource pool for use by the wireless terminal when the wireless terminal is either in the partial coverage discovery scenario or the out-of-coverage discovery scenario.

Example Embodiment 45

The method of example embodiment 44, further comprising generating a selection signal configured to inform the wireless terminal which of plural constituent pools of the pool are not eligible for use by the wireless terminal.

Example Embodiment 46

The method of example embodiment 45, further comprising the wireless terminal using an eligible one of the plural constituent pools of the pool for the sidelink direct discovery.

Example Embodiment 47

The method of example embodiment 44, further comprising generating a selection signal configured to inform the wireless terminal regarding eligibility of at least one of the in-coverage radio resource pool and the out-of-coverage radio resource pool for use by the wireless terminal.

Example Embodiment 48

The method of example embodiment 45, further comprising providing to the wireless terminal an in-coverage indication so that the in-coverage radio resource pool associated with the in-coverage indication is identified as an in-coverage radio resource pool and an out-of-coverage indication so that the out-of-coverage radio resource pool associated with the out-of-coverage indication is identified as an out-of-coverage radio resource pool.

Example Embodiment 49

The method of example embodiment 48, further comprising: the wireless terminal determining from the selection signal regarding eligibility of at least one of the in-coverage radio resource pool and the out-of-coverage radio resource pool for use by the wireless terminal; the wireless terminal using an eligible one of the in-coverage radio resource pool and the out-of-coverage radio resource pool for the sidelink direct discovery.

Example Embodiment 50

A method in a wireless terminal comprising: receiving over a radio interface information regarding a radio resource pool allocated to the wireless terminal for sidelink direct discovery when the wireless terminal is either in partial coverage discovery scenario or out-of-coverage discovery scenario; the wireless terminal when either in partial coverage of the radio access network or out-of-coverage of the radio access network using a resource of the pool for sidelink direct discovery.

Example Embodiment 51

The method of example embodiment 50, further comprising the wireless terminal using the resource of the pool for sending a sidelink direct discovery announcement.

Example Embodiment 52

The method of example embodiment 50, further comprising the wireless terminal using the resource of the pool for monitoring a sidelink direct discovery announcement of another wireless terminal.

Example Embodiment 53

The method of example embodiment 50, further comprising receiving the information from a node of a radio access network.

Example Embodiment 54

The method of example embodiment 50, further comprising receiving the information regarding the pool in broadcast or dedicated signaling when wireless terminal autonomous resource selection is implemented.

Example Embodiment 55

The method of example embodiment 50, further comprising receiving the information regarding the pool in dedicated signaling when wireless terminal scheduled resource allocation is implemented.

Example Embodiment 56

The method of example embodiment 50, wherein the pool includes an in-coverage radio resource pool allocated for sidelink direct discovery, and wherein the method further comprises the wireless terminal using the in-coverage radio resource pool use when the wireless terminal is in coverage of the radio network.

Example Embodiment 57

The method of example embodiment 56, wherein the in-coverage radio resource pool includes and the wireless terminal uses for the sidelink direct discovery one or more of the following: (1a) an in-coverage resource pool allocated by a serving cell; (1b) an in-coverage resource pool allocated by a (1b1) non-serving carrier and/or a (1b2) secondary cell, wherein the non-serving carrier and/or a secondary cell belong to a same public land mobile network (PLMN) as the node; (1c) an in-coverage resource pool allocated by a (1c1) non-serving carrier and/or a (1c2) secondary cell, wherein the non-serving carrier and/or a secondary cell belong to a different public land mobile network (PLMN) than the node.

Example Embodiment 58

The method of example embodiment 50, wherein the pool includes an out-of-coverage radio resource pool allocated for sidelink direct discovery use, and wherein the method further comprises the wireless terminal using the out-of-coverage radio resource pool use when the wireless terminal is either in the partial coverage discovery scenario or the out-of-coverage discovery scenario.

Example Embodiment 59

The method of example embodiment 39, wherein the out-of-coverage radio resource pool includes and the wireless terminal uses one or more of the following when the wireless terminal is either in the partial coverage discovery scenario or the out-of-coverage discovery scenario: (2a) an out-of-coverage resource pool allocated by a serving cell; (2b) an out-of-coverage resource pool allocated by a (2b1) non-serving carrier and/or a (2b2) secondary cell, wherein the non-serving carrier and/or a secondary cell belong to a same public land mobile network (PLMN) as the node; (2c) an out-of-coverage resource pool allocated by a (2c1) non-serving carrier and/or a (2c2) secondary cell, wherein the non-serving carrier and/or a secondary cell belong to a different public land mobile network (PLMN) than the node.

Example Embodiment 60

The method of example embodiment 50, further wherein the pool is configured to include an in-coverage radio resource pool allocated for the wireless terminal to use when the wireless terminal is in coverage of the radio access network and an out-of-coverage radio resource pool for use by the wireless terminal when the wireless terminal is either in the partial coverage discovery scenario or the out-of-coverage discovery scenario.

Example Embodiment 61

The method of example embodiment 60, further comprising: the wireless terminal determining, from a selection signal received from the access node, which of plural constituent pools of the pool are not eligible for use by the wireless terminal; the wireless terminal using an eligible one of the plural constituent pools of the pool for the sidelink direct discovery Example Embodiment 62

The method of example embodiment 60, further comprising: the wireless terminal determining, from a selection signal received from the access node, regarding eligibility of at least one of the in-coverage radio resource pool and the out-of-coverage radio resource pool for use by the wireless terminal; the wireless terminal using an eligible one of the in-coverage radio resource pool and the out-of-coverage radio resource pool for the sidelink direct discovery.

Example Embodiment 63

A wireless terminal comprising: a receiver configured to receive over a radio interface information regarding a radio resource pool allocated to the wireless terminal for sidelink direct discovery when the wireless terminal is either in partial coverage discovery scenario or out-of-coverage discovery scenario; a processor configured to use a resource of the pool for sidelink direct discovery when the wireless terminal is either in partial coverage of the radio access network or out-of-coverage of the radio access network.

Example Embodiment 64

The wireless terminal of example embodiment 63, wherein the processor is configured to use the resource of the pool for sending a sidelink direct discovery announcement.

Example Embodiment 65

The wireless terminal of example embodiment 63, wherein the processor is configured to use the resource of the pool for monitoring a sidelink direct discovery announcement of another wireless terminal.

Example Embodiment 66

The wireless terminal of example embodiment 63, wherein the receiver is configured to receive the information regarding the pool in Radio Resource Control (RRC) signaling.

Example Embodiment 67

The wireless terminal of example embodiment 63, wherein the receiver is configured to receive the information regarding the pool in broadcast or dedicated signaling when wireless terminal autonomous resource selection is implemented.

Example Embodiment 68

The wireless terminal of example embodiment 63, wherein the receiver is configured to receive the information regarding the pool in dedicated signaling when wireless terminal scheduled resource allocation is implemented.

Example Embodiment 69

The wireless terminal of example embodiment 63, wherein the pool includes an in-coverage radio resource pool allocated for sidelink direct discovery, and wherein the processor is further configured to use the in-coverage radio resource pool use when the wireless terminal is in coverage of the radio network.

Example Embodiment 70

The wireless terminal of example embodiment 69, wherein the in-coverage radio resource pool includes and wherein the processor is further configured to use for the sidelink direct discovery one or more of the following: (1a) an in-coverage resource pool allocated by a serving cell; (1b) an in-coverage resource pool allocated by a (1b1) non-serving carrier and/or a (1b2) secondary cell, wherein the non-serving carrier and/or a secondary cell belong to a same public land mobile network (PLMN) as the node; (1c) an in-coverage resource pool allocated by a (1c1) non-serving carrier and/or a (1c2) secondary cell, wherein the non-serving carrier and/or a secondary cell belong to a different public land mobile network (PLMN) than the node.

Example Embodiment 71

The wireless terminal of example embodiment 63, wherein the pool includes an out-of-coverage radio resource pool allocated for sidelink direct discovery use, and wherein the processor is further configured to use the out-of-coverage radio resource pool for sidelink direct discovery use when the wireless terminal is either in the partial coverage discovery scenario or the out-of-coverage discovery scenario.

Example Embodiment 72

The wireless terminal of example embodiment 71, wherein the out-of-coverage radio resource pool includes and the processor is configured to use one or more of the following when the wireless terminal is either in the partial coverage discovery scenario or the out-of-coverage discovery scenario: (2a) an out-of-coverage resource pool allocated by a serving cell; (2b) an out-of-coverage resource pool allocated by a (2b1) non-serving carrier and/or a (2b2) secondary cell, wherein the non-serving carrier and/or a secondary cell belong to a same public land mobile network (PLMN) as the node; (2c) an out-of-coverage resource pool allocated by a (2c1) non-serving carrier and/or a (2c2) secondary cell, wherein the non-serving carrier and/or a secondary cell belong to a different public land mobile network (PLMN) than the node.

Example Embodiment 73

The wireless terminal of example embodiment 63, further wherein the pool is configured to include an in-coverage radio resource pool allocated for the wireless terminal to use when the wireless terminal is in coverage of the radio access network and an out-of-coverage radio resource pool for use by the wireless terminal when the wireless terminal is either in the partial coverage discovery scenario or the out-of-coverage discovery scenario.

Example Embodiment 74

The wireless terminal of example embodiment 73, wherein the processor is configured: to determine, from a selection signal, which of plural constituent pools of the pool are not eligible for use by the wireless terminal; to use an eligible one of the plural constituent pools of the pool for the sidelink direct discovery.

Example Embodiment 75

The wireless terminal of example embodiment 73, wherein the processor is configured: to determine, from a selection signal, eligibility of at least one of the in-coverage radio resource pool and the out-of-coverage radio resource pool for use by the wireless terminal; to use an eligible one of the in-coverage radio resource pool and the out-of-coverage radio resource pool for the sidelink direct discovery.

Example Embodiment 76

A method in a communications network comprising: configuring plural radio resource pools for use by the wireless terminal in sidelink direct discovery; providing a selection signal configured to enable the wireless terminal to make a selection of a selected radio resource pool to use for the sidelink direct discovery; the wireless terminal using the selected radio resource pool for the sidelink direct discovery.

Example Embodiment 77

The method of example embodiment 76, wherein the plural radio resource pool comprise plural types of radio resource pools, and wherein the selection signal comprises a pool selection signal configured to select between the plural types of radio resource pool for use by the wireless terminal in the sidelink direct discovery.

Example Embodiment 78

The method of example embodiment 77, wherein the plural types of radio resource pools comprise in-coverage radio resource pools and out-of-coverage radio resource pools, and wherein the pool selection signal selects between the in-coverage radio resource pools and out-of-coverage radio resource pools for use by the wireless terminal in the sidelink direct discovery.

Example Embodiment 79

The method of example embodiment 77, wherein the plural types of radio resource pools comprise radio resource pools obtained from different sources; and wherein the pool selection signal selects between the differently obtained radio resource pool for use by the wireless terminal in the sidelink direct discovery.

Example Embodiment 80

The method of example embodiment 79, wherein the different sources comprise one or more of the following: an externally loaded memory device wherein plural radio resource pools are preconfigured and/or reconfigured by the node; a broadcast channel of another wireless terminal; a sidelink direct discovery signal from another wireless terminal.

Example Embodiment 81

The method of example embodiment 76, further comprising: another wireless terminal generating the selection signal; and the another wireless terminal transmitting the selection signal to the wireless terminal.

Example Embodiment 82

The method of example embodiment 81, further comprising: the wireless terminal receiving the selection signal when the wireless terminal is in coverage of the radio access network; the wireless terminal when either in partial coverage of the radio access network or out-of-coverage of the radio access network using a resource of a pool selected by the selection signal for the sidelink direct discovery.

Example Embodiment 83

The method of example embodiment 76, further comprising: configuring the plural radio resource pools for use by the wireless terminal when the wireless terminal is either in a partial coverage discovery scenario or an out-of-coverage discovery scenario.

Example Embodiment 84

The method of example embodiment 76, further comprising the wireless terminal obtaining the selection signal from one or more of the following: an externally loaded memory device wherein plural radio resource pools and the selection signal are preconfigured and/or reconfigured by the node; a broadcast channel of another wireless terminal; a sidelink direct discovery signal from another wireless terminal.

Example Embodiment 85

A method in entity which communicates with a wireless terminal over a radio interface, the method comprising: the node configuring plural radio resource pools for use by the wireless terminal in sidelink direct discovery and providing the plural radio resource pools to the wireless terminal; the entity generating and providing to the wireless terminal a selection signal configured to enable the wireless terminal to make a selection of a selected radio resource pool to use for the sidelink direct discovery.

Example Embodiment 86

The method of example embodiment 85, wherein the plural radio resource pool comprise plural types of radio resource pools, and wherein the selection signal comprises a pool selection signal configured to select between the plural types of radio resource pool for use by the wireless terminal in the sidelink direct discovery.

Example Embodiment 87

The method of example embodiment 86, wherein the plural types of radio resource pools comprise in-coverage radio resource pools and out-of-coverage radio resource pools, and wherein the pool selection signal is configured to select between the in-coverage radio resource pools and out-of-coverage radio resource pools for use by the wireless terminal in the sidelink direct discovery.

Example Embodiment 88

The method of example embodiment 86, wherein the plural types of radio resource pools comprise radio resource pools obtained from different sources; and wherein the pool selection signal selects between the differently obtained radio resource pool for use by the wireless terminal in the sidelink direct discovery.

Example Embodiment 89

The method of example embodiment 88, wherein the different sources comprise one or more of the following: a memory of the wireless terminal; a broadcast channel of another wireless terminal; a sidelink direct discovery signal from another wireless terminal.

Example Embodiment 90

The method of example embodiment 85, further comprising: the entity configuring the plural radio resource pools for use by the wireless terminal when the wireless terminal is either in a partial coverage discovery scenario or an out-of-coverage discovery scenario.

Example Embodiment 91

An entity which communicates with a wireless terminal over a radio interface, the node comprising: a processor configured to: configure plural radio resource pools for use by the wireless terminal in sidelink direct discovery and providing the plural radio resource pools to the wireless terminal; generate a selection signal configured to enable the wireless terminal to make a selection of a selected radio resource pool to use for the sidelink direct discovery; a transmitter configured to transmit information related to the plural radio resource pools and the selection signal to the wireless terminal over the radio interface.

Example Embodiment 92

The entity of example embodiment 91, wherein the processor is configured to: configure the plural radio resource pool to comprise plural types of radio resource pools; and to generate the selection signal to comprise a pool selection signal configured to select between the plural types of radio resource pool for use by the wireless terminal in the sidelink direct discovery.

Example Embodiment 93

The entity of example embodiment 92, wherein the plural types of radio resource pools comprise in-coverage radio resource pools and out-of-coverage radio resource pools, and wherein the processor is configured to generate the pool selection signal to select between the in-coverage radio resource pools and out-of-coverage radio resource pools for use by the wireless terminal in the sidelink direct discovery.

Example Embodiment 94

The entity of example embodiment 92, wherein the plural types of radio resource pools comprise radio resource pools obtained from different sources; and wherein the processor is configured to generate the pool selection signal to select between the differently obtained radio resource pool for use by the wireless terminal in the sidelink direct discovery.

Example Embodiment 95

The entity of example embodiment 94, wherein the different sources comprise one or more of the following: a memory of the wireless terminal; a broadcast channel of another wireless terminal; a sidelink direct discovery signal from another wireless terminal.

Example Embodiment 96

The entity of example embodiment 91, wherein the processor is further configured to configure the plural radio resource pools for use by the wireless terminal when the wireless terminal is either in a partial coverage discovery scenario or an out-of-coverage discovery scenario.

Example Embodiment 97

A method in a wireless terminal comprising: obtaining plural radio resource pools for use by the wireless terminal in sidelink direct discovery; obtaining a selection signal configured to enable the wireless terminal to make a selection of a selected radio resource pool to use for the sidelink direct discovery; the wireless terminal using the selected radio resource pool for the sidelink direct discovery.

Example Embodiment 98

The method of example embodiment 97, wherein the plural radio resource pool comprise plural types of radio resource pools, wherein the selection signal comprises a pool selection signal, and wherein the wireless terminal uses the pool selection signal to select between the plural types of radio resource pool for use by the wireless terminal in the sidelink direct discovery.

Example Embodiment 99

The method of example embodiment 98, wherein the plural types of radio resource pools comprise in-coverage radio resource pools and out-of-coverage radio resource pools, and wherein the wireless terminal uses the pool selection signal to select between the in-coverage radio resource pools and out-of-coverage radio resource pools for use by the wireless terminal in the sidelink direct discovery.

Example Embodiment 100

The method of example embodiment 98, wherein the plural types of radio resource pools comprise radio resource pools obtained from different sources; and wherein the wireless terminal uses the pool selection signal to select between the differently obtained radio resource pool for use by the wireless terminal in the sidelink direct discovery.

Example Embodiment 101

The method of example embodiment 100, wherein the different sources comprise one or more of the following: a memory of the wireless terminal; a broadcast channel of another wireless terminal; a sidelink direct discovery signal from another wireless terminal.

Example Embodiment 102

The method of example embodiment 97, further comprising receiving the selection signal over the radio interface.

Example Embodiment 103

The method of example embodiment 102, further comprising: the wireless terminal receiving the selection signal when the wireless terminal is in coverage of the radio access network; the wireless terminal when either in partial coverage of the radio access network or out-of-coverage of the radio access network using a resource of a pool selected by the selection signal for the sidelink direct discovery.

Example Embodiment 104

The method of example embodiment 97, further comprising: the wireless terminal using a selected one of the plural radio resource pools for sidelink direct discovery when the wireless terminal is either in a partial coverage discovery scenario or an out-of-coverage discovery scenario.

Example Embodiment 105

The method of example embodiment 97, further comprising the wireless terminal obtaining the selection signal from one or more of the following: a memory device of the wireless terminal; a broadcast channel of another wireless terminal; a sidelink direct discovery signal from another wireless terminal.

Example Embodiment 106

A wireless terminal comprising: a memory configured to store plural radio resource pools for use by the wireless terminal in sidelink direct discovery; a memory configured to store a selection signal configured to enable the wireless terminal to make a selection of a selected radio resource pool to use for the sidelink direct discovery; a processor configured to use the selection signal to select the selected radio resource pool and to use the selected radio resource pool for the sidelink direct discovery.

Example Embodiment 107

The wireless terminal of example embodiment 106, wherein the plural radio resource pool comprise plural types of radio resource pools, wherein the selection signal comprises a pool selection signal, and wherein the processor is configured to use the pool selection signal to select between the plural types of radio resource pool for use by the wireless terminal in the sidelink direct discovery.

Example Embodiment 108

The wireless terminal of example embodiment 107, wherein the plural types of radio resource pools comprise in-coverage radio resource pools and out-of-coverage radio resource pools, and wherein the processor is configured to use the pool selection signal to select between the in-coverage radio resource pools and out-of-coverage radio resource pools for use by the wireless terminal in the sidelink direct discovery.

Example Embodiment 109

The wireless terminal of example embodiment 107, wherein the plural types of radio resource pools comprise radio resource pools obtained from different sources; and wherein the processor is configured to use the pool selection signal to select between the differently obtained radio resource pool for use by the wireless terminal in the sidelink direct discovery.

Example Embodiment 110

The wireless terminal of example embodiment 109, wherein the different sources comprise one or more of the following: a memory of the wireless terminal; a broadcast channel of another wireless terminal; a sidelink direct discovery signal from another wireless terminal.

Example Embodiment 111

The wireless terminal of example embodiment 106, further comprising a receiver configured to receive the selection signal over the radio interface.

Example Embodiment 112

The wireless terminal of example embodiment 111, wherein the receiver is configured to receive the selection signal when the wireless terminal is in coverage of the radio access network; and wherein the processor is configured when the wireless terminal is either in partial coverage of the radio access network or out-of-coverage of the radio access network to use a resource of a pool selected by the selection signal for the sidelink direct discovery.

Example Embodiment 113

The wireless terminal of example embodiment 106, wherein the processor is further configured to use a selected one of the plural radio resource pools for sidelink direct discovery when the wireless terminal is either in a partial coverage discovery scenario or an out-of-coverage discovery scenario.

Example Embodiment 114

The wireless terminal of example embodiment 106, wherein the processor is configured to obtain the selection signal from one or more of the following: a memory of the wireless terminal; a broadcast channel of another wireless terminal; a sidelink direct discovery signal from another wireless terminal.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A radio access node of a radio access network, the access node comprising:
    a processor configured and arranged to configure, for a wireless terminal that is served by the node, a radio resource pool including an out-of-coverage radio resource for the wireless terminal to use for sidelink direct discovery when the wireless terminal is either in a partial coverage discovery scenario or an out-of-coverage discovery scenario;
    a transmitter configured to transmit information regarding the pool over a radio interface to the wireless terminal when the wireless terminal is in coverage of the radio access network.

2. The node of claim 1, wherein the transmitter is configured to transmit the information regarding the pool in Radio Resource Control (RRC) signaling.

3. The node of claim 1, wherein the transmitter is configured to transmit the information regarding the pool in broadcast or dedicated signaling when wireless terminal autonomous resource selection is implemented.

4. The node of claim 1, wherein the transmitter is configured to transmit the information regarding the pool in dedicated signaling when wireless terminal scheduled resource allocation is implemented.

5. The node of claim 1, wherein the processor is further configured to configure the pool to include an in-coverage radio resource pool allocated for the wireless terminal to use when the wireless terminal is in coverage of the radio access network.

6. A method in a radio access node comprising:
    configuring, for a wireless terminal, a radio resource pool including an out-of-coverage radio resource for use in sidelink direct discovery when the wireless terminal is either in a partial coverage discovery scenario or an out-of-coverage discovery scenario;
    transmitting information regarding the pool over a radio interface to the wireless terminals when the wireless terminal is in coverage of the radio access network.

7. A method in a wireless terminal comprising:
    receiving over a radio interface information regarding a radio resource pool allocated to the wireless terminal for sidelink direct discovery when the wireless terminal is either in partial coverage discovery scenario or out-of-coverage discovery scenario;
    the wireless terminal when either in partial coverage of the radio access network or out-of-coverage of the radio access network using a resource of the pool for sidelink direct discovery.

8. A wireless terminal comprising:
    a receiver configured to receive over a radio interface information regarding a radio resource pool allocated to the wireless terminal for sidelink direct discovery when the wireless terminal is either in partial coverage discovery scenario or out-of-coverage discovery scenario;
    a processor configured to use a resource of the pool for sidelink direct discovery when the wireless terminal is either in partial coverage of the radio access network or out-of-coverage of the radio access network.

9. The wireless terminal of claim 8, wherein the processor is configured to use the resource of the pool for sending a sidelink direct discovery announcement.

10. The wireless terminal of claim 8, wherein the processor is configured to use the resource of the pool for monitoring a sidelink direct discovery announcement of another wireless terminal.

11. The wireless terminal of claim 8, wherein the receiver is configured to receive the information regarding the pool in Radio Resource Control (RRC) signaling.

12. The wireless terminal of claim 8, wherein the receiver is configured to receive the information regarding the pool in broadcast or dedicated signaling when wireless terminal autonomous resource selection is implemented.

13. The wireless terminal of claim 8, wherein the receiver is configured to receive the information regarding the pool in dedicated signaling when wireless terminal scheduled resource allocation is implemented.

14. The wireless terminal of claim 8, wherein the pool includes an in-coverage radio resource pool allocated for sidelink direct discovery, and wherein the processor is further configured to use the in-coverage radio resource pool use when the wireless terminal is in coverage of the radio network.

* * * * *